US012582571B2

(12) United States Patent
Lamb et al.

(10) Patent No.: US 12,582,571 B2

(45) Date of Patent: Mar. 24, 2026

(54) MOBILITY SYSTEMS AND METHODS

(71) Applicant: ALTIMATE MEDICAL, INC., Morton, MN (US)

(72) Inventors: Clark Lamb, Hector, MN (US); Matt Haugen, Hector, MN (US); Leo Schweiss, Fairfax, MN (US); Wesley Ovre, Redwood Falls, MN (US)

(73) Assignee: Altimate Medical, Inc., Morton, MN (US)

(*) Notice: Subject to any disclaimer, the term of this patent is extended or adjusted under 35 U.S.C. 154(b) by 229 days.

(21) Appl. No.: 17/908,609

(22) PCT Filed: Mar. 4, 2021

(86) PCT No.: PCT/US2021/020785

§ 371 (c)(1),
(2) Date: Sep. 1, 2022

(87) PCT Pub. No.: WO2021/183352

PCT Pub. Date: Sep. 16, 2021

(65) Prior Publication Data

US 2023/0121597 A1 Apr. 20, 2023

Related U.S. Application Data

(60) Provisional application No. 62/986,968, filed on Mar. 9, 2020.

(51) Int. Cl.

| | |
|---|---|
| ***A61H 3/04*** | (2006.01) |
| ***A61G 5/10*** | (2006.01) |
| *A61H 3/00* | (2006.01) |

(52) U.S. Cl.

CPC ................ *A61H 3/04* (2013.01); *A61G 5/10* (2013.01); *A61H 2003/005* (2013.01)

(58) Field of Classification Search

CPC ................ A61H 3/04; A61H 2003/005; A61H 2003/007; A61H 2200/164; A61G 5/128

See application file for complete search history.

(56) References Cited

U.S. PATENT DOCUMENTS

| | | | |
|---|---|---|---|
| 1,972,557 A | 9/1934 | Greene | |
| 2,669,289 A * | 2/1954 | Usher | A61G 5/1062 248/172 |

(Continued)

FOREIGN PATENT DOCUMENTS

| | | |
|---|---|---|
| CN | 206687846 U | 12/2017 |
| EP | 1466574 A1 | 10/2004 |

(Continued)

OTHER PUBLICATIONS

Office action from Canadian Application No. 2,174,886 dated Jan. 4, 2024.

(Continued)

*Primary Examiner* — Noah Chandler Hawk

(74) *Attorney, Agent, or Firm* — Calfee, Halter & Griswold LLP

(57) ABSTRACT

Described herein are various improvements to mobility devices. These improvements include, for example, adjustable lateral body supports, multi axial supports for accommodating movement of the pelvis during walking, frame folding assemblies for accommodating storage and transportation, detachable support couplings for supportive accessories, foldaway footplate assemblies for allowing users to rest, wheel brake systems, caster wheel systems, suspension support systems, control button assemblies, and center of gravity adjustment assemblies. One or more these improvements can be combined into various mobility devices as will be described in more detail hereinafter.

22 Claims, 26 Drawing Sheets

(56) References Cited

U.S. PATENT DOCUMENTS

| | | | | | |
|---|---|---|---|---|---|
| 2,991,485 | A * | 7/1961 | Schulte | A61G 7/1067 | 5/83.1 |
| 3,941,399 | A * | 3/1976 | Peters | B62B 1/264 | 414/456 |
| 4,188,966 | A * | 2/1980 | Palmer | A61H 3/04 | 482/67 |
| 4,211,426 | A * | 7/1980 | Motloch | A47D 13/04 | 297/307 |
| 4,890,853 | A | 1/1990 | Olson | | |
| 4,969,660 | A * | 11/1990 | Spak | B62B 1/12 | 280/646 |
| 4,981,305 | A | 1/1991 | Lockard et al. | | |
| 4,989,890 | A * | 2/1991 | Lockard | A61G 5/128 | 280/42 |
| 5,054,852 | A | 10/1991 | Tholkes | | |
| 5,275,426 | A * | 1/1994 | Tankersley | A61H 3/008 | 280/87.051 |
| 5,365,621 | A * | 11/1994 | Blain | A61G 7/1046 | D12/128 |
| 5,484,151 | A | 1/1996 | Tholkes | | |
| 5,884,935 | A | 3/1999 | Tholkes | | |
| 6,142,914 | A | 11/2000 | Crawford et al. | | |
| 6,440,046 | B1 | 8/2002 | Tholkes | | |
| 6,607,202 | B1 * | 8/2003 | Palmer | A61H 3/04 | 135/65 |
| 6,832,770 | B1 * | 12/2004 | Wright-Ott | A61G 5/14 | 280/87.051 |
| 8,104,835 | B2 | 1/2012 | Ovre et al. | | |
| 8,567,808 | B2 | 10/2013 | Tholkes et al. | | |
| 9,079,089 | B2 | 7/2015 | Okken et al. | | |
| 9,161,872 | B2 | 10/2015 | Lee et al. | | |
| 9,695,917 | B2 | 7/2017 | Lokken | | |
| 9,827,162 | B1 | 11/2017 | Vidmar | | |
| 9,855,175 | B2 * | 1/2018 | Wike, Jr. | A61G 5/1005 | |
| 9,931,257 | B2 | 4/2018 | Lokken et al. | | |
| 10,016,324 | B1 * | 7/2018 | Howard | A61H 3/00 | |
| 10,251,805 | B2 * | 4/2019 | Morbi | A61G 7/1019 | |
| 2002/0020986 | A1 | 2/2002 | Rossi et al. | | |
| 2016/0381271 | A1 | 12/2016 | Cheng et al. | | |
| 2017/0202727 | A1 * | 7/2017 | Wegener | A61H 3/00 | |
| 2017/0252602 | A1 | 9/2017 | Lefkovitz | | |

FOREIGN PATENT DOCUMENTS

| | | | |
|---|---|---|---|
| EP | 3285708 | | 6/2019 |
| JP | S4719962 | | 11/1972 |
| WO | 2012037910 | A1 | 3/2012 |
| WO | 2015137877 | | 9/2015 |
| WO | 2018014139 | A1 | 1/2018 |
| WO | 2018154234 | | 8/2018 |
| WO | 2019126867 | | 7/2019 |

OTHER PUBLICATIONS

Written Opinion and International Search Report from PCT/US21/20785 dated Jul. 28, 2021 (12 pages).

Search Report from European Application No. 21767591.7 dated Aug. 1, 2023.

Search Report from European Application No. 25198288.0 dated Dec. 15, 2025.

* cited by examiner

Fig. 5D
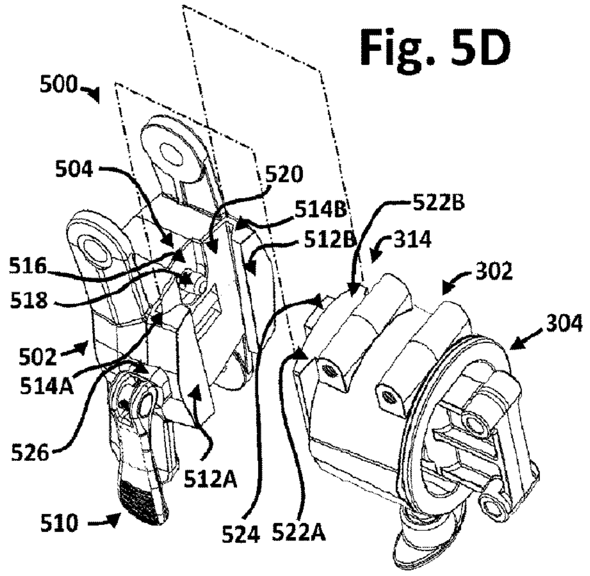
Fig. 5E
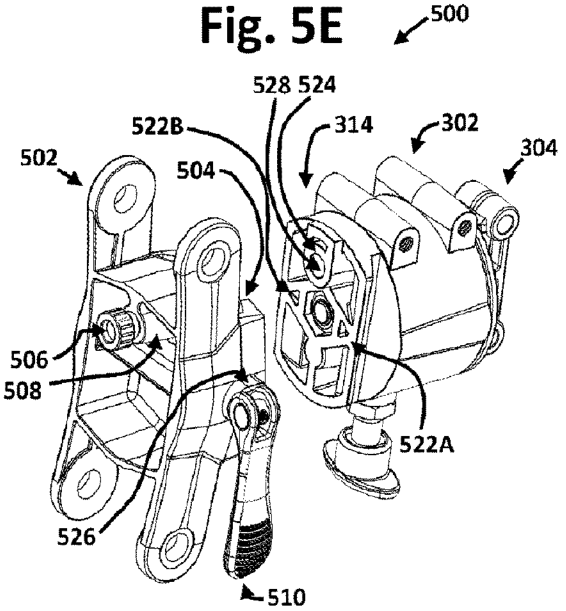
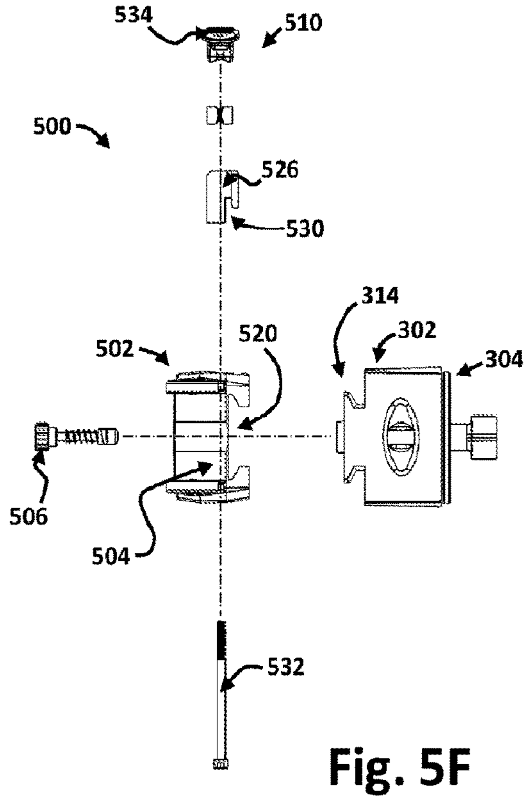
Fig. 5F
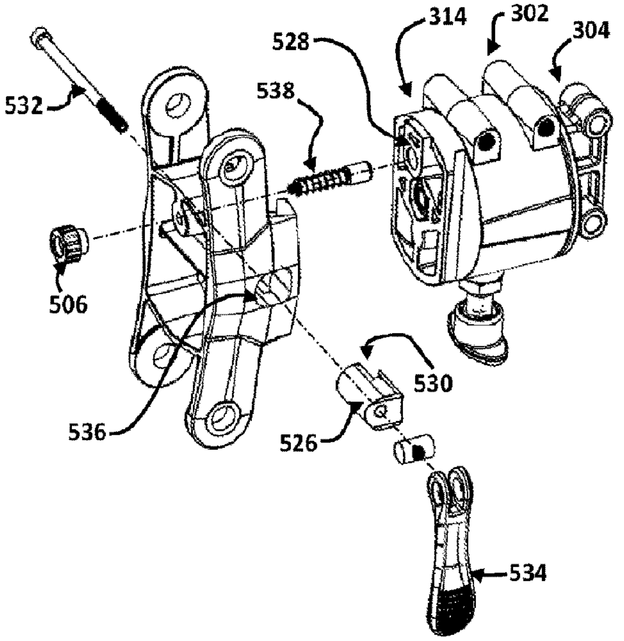
Fig. 5G

Fig. 9A
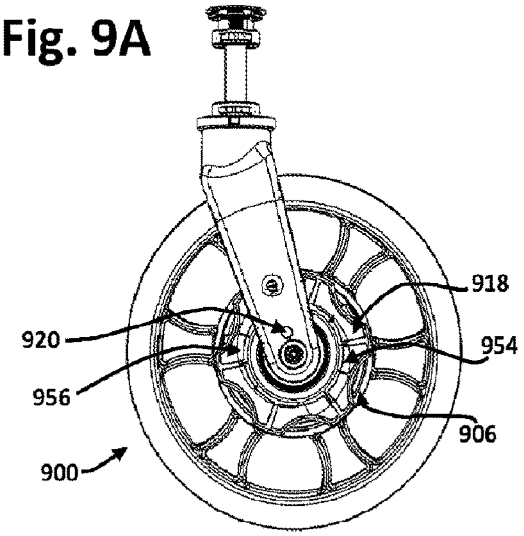
Fig. 9B
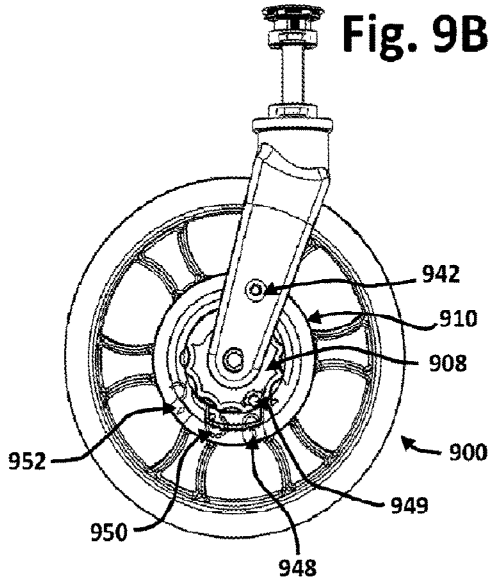
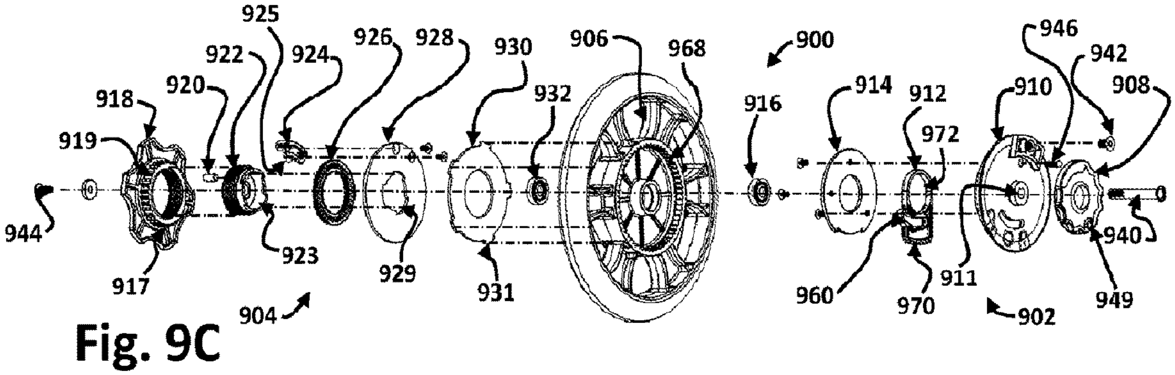
Fig. 9C
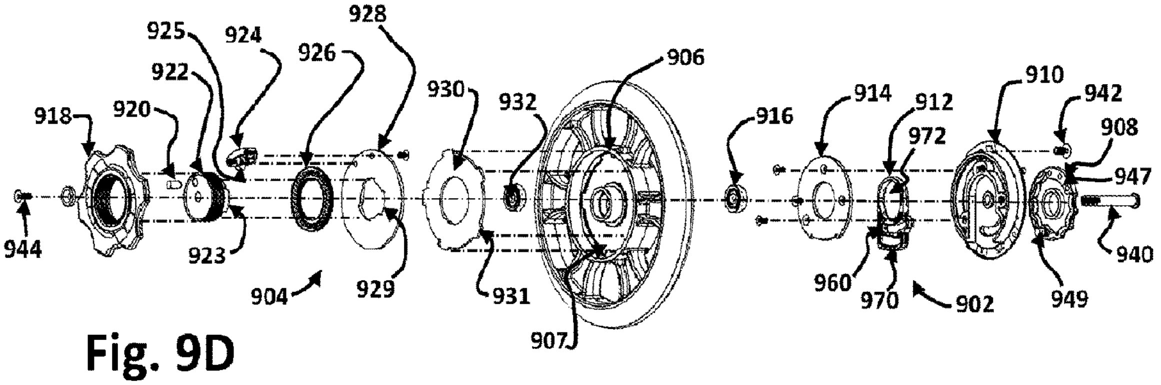
Fig. 9D

MOBILITY SYSTEMS AND METHODS

RELATED APPLICATIONS

This application is the national stage entry of PCT/US2022/020785, filed on Mar. 9, 2020, titled Mobility Systems and Methods, which claims priority to and all benefit of U.S. Provisional Patent Application Ser. No. 62/986,968, filed on Mar. 9, 2020, titled Mobility Systems and Methods, and the entire disclosures of which are incorporated herein by reference.

Industrial, commercial and medical mobility systems have many components that must come together to provide the required mobility. One type of medical mobility device is a gait trainer. A gait trainer is an assistive and support device that enables walking and mobility in persons who would otherwise have difficulty or inability to walk unassisted. While gait trainers perform this important function, improvements are desired in several areas. These areas include gait trainer user positioning, support, and freedom of movement, ease of accessory connect and disconnect, and gait trainer movement, braking, and locking.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIGS. 5A-5I illustrate one embodiment of a coupling mechanism;

FIGS. 9A-9G illustrate one embodiment of a caster wheel system;

SUMMARY

Figure 1A:
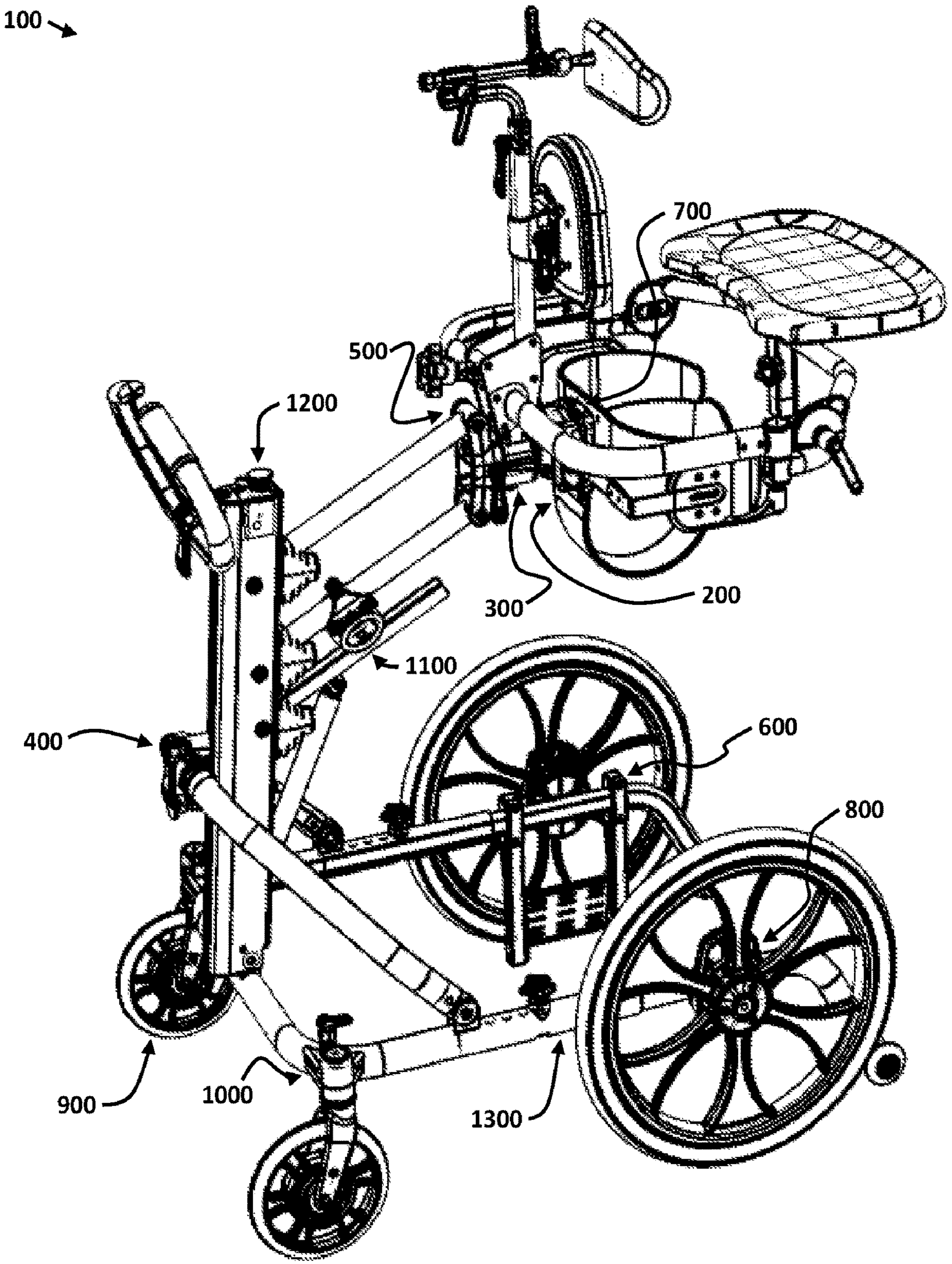
FIGS. 1A-1F illustrate one embodiment of a mobility device in the form of a gait trainer.
Figure 1B:
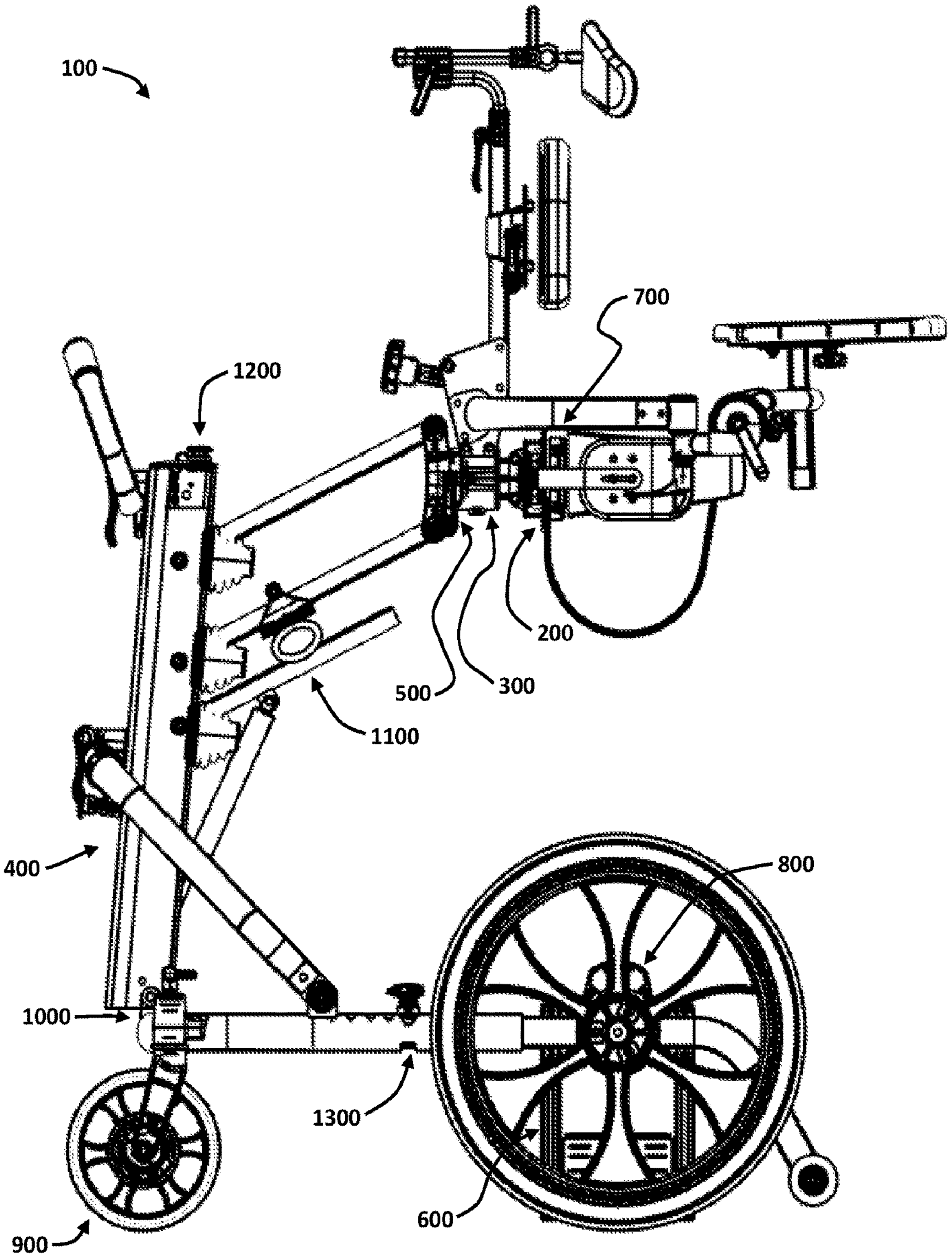
Figure 1C:
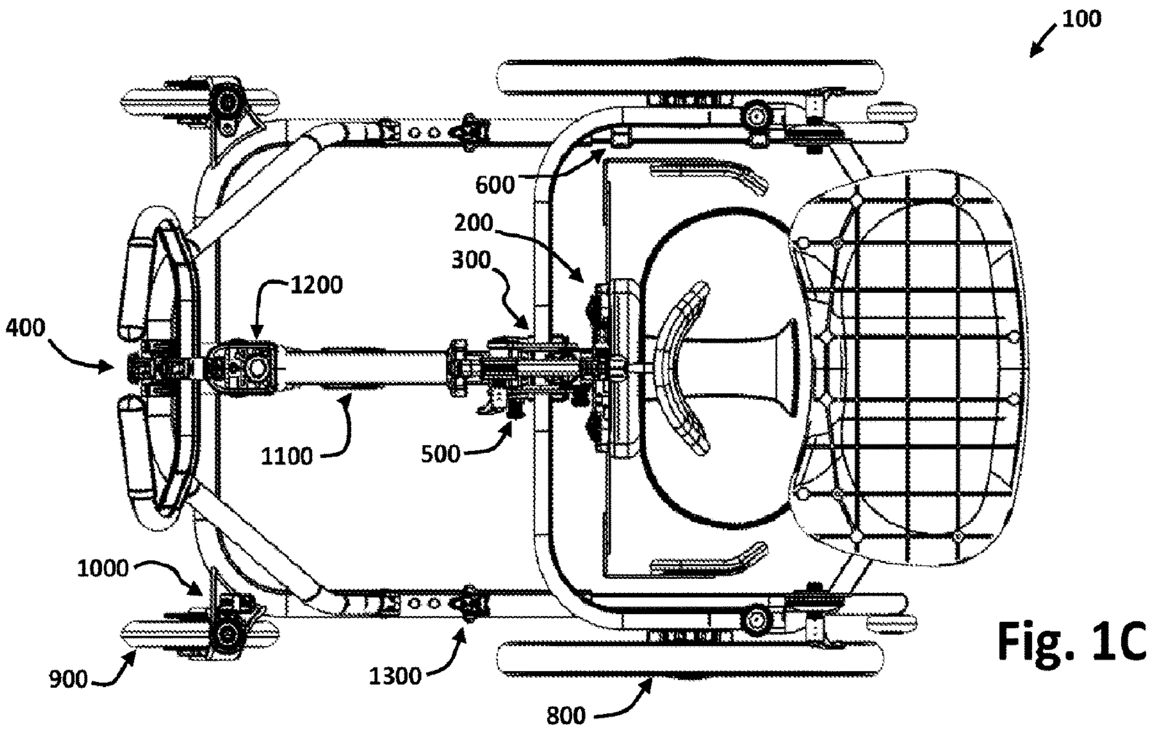
Figure 1D:
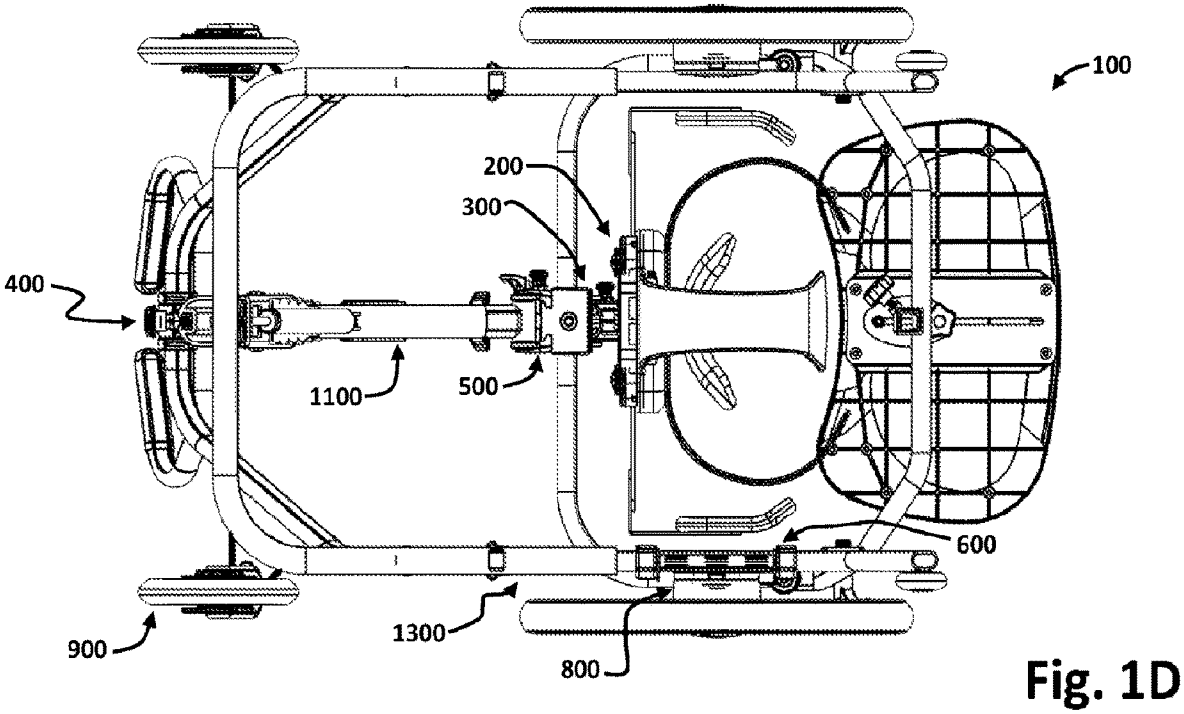
Figure 1E:
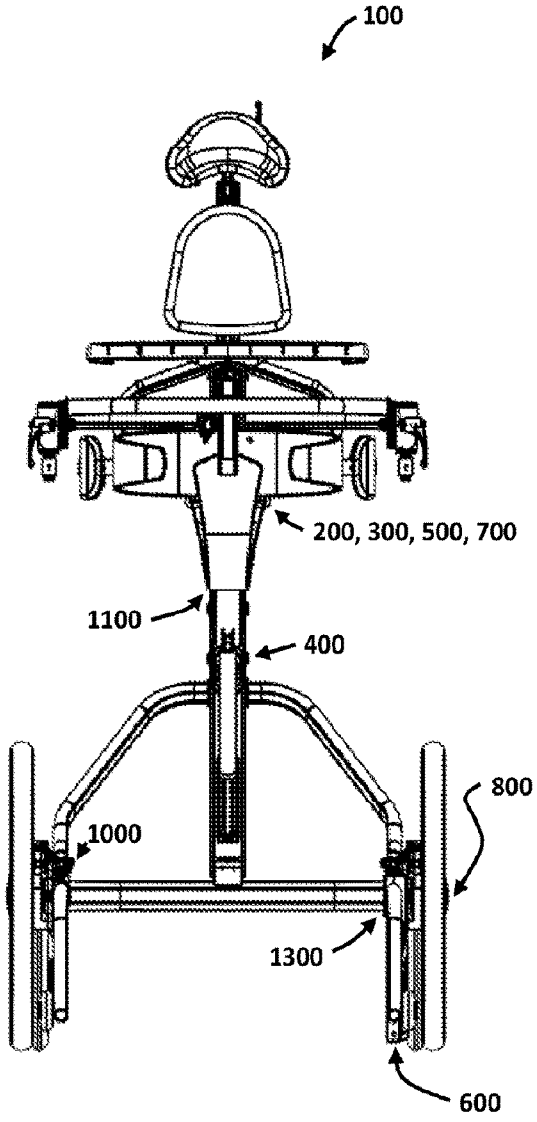
Figure 1F:
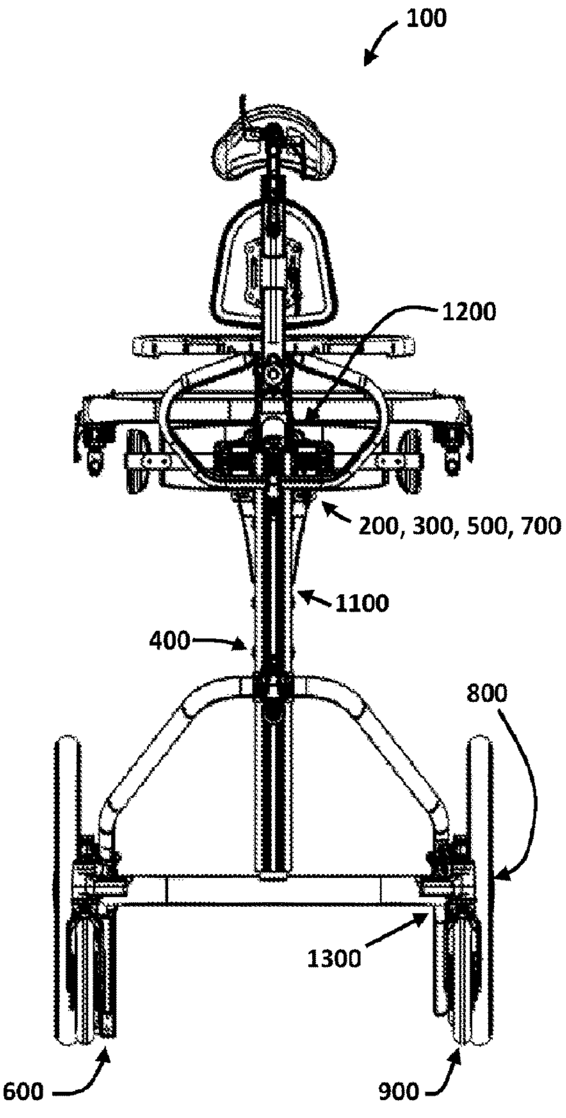

Described herein are various improvements to mobility devices. These improvements include, for example, adjustable lateral body supports, multi axial supports for accommodating movement of the pelvis during walking, frame folding assemblies for accommodating storage and transportation, detachable support couplings for supportive accessories, foldaway footplate assemblies for allowing users to rest, wheel brake systems, caster wheel systems, suspension support systems, control button assemblies, and center of gravity adjustment assemblies. One or more these improvements can be combined into various mobility devices as will be described in more detail hereinafter.

DESCRIPTION

As described herein, when one or more components are described or shown as being connected, joined, affixed, coupled, attached, or otherwise interconnected, such interconnection may be direct as between the components or may be indirect such as through the use of one or more intermediary components. Also, as described herein, reference to a member, component, or portion shall not be limited to a single structural member, component, element, or portion but can include an assembly of components, members, elements, or portions.

While many of the innovations herein are described in the general context of a mobility device such as, for example, a gait trainer, their use is not limited gait trainers. These innovations are applicable to other mobility systems including industrial, commercial, and medical mobility systems. Industrial mobility systems include, for example, material/product handling and movement vehicles and similar devices used in industrial and manufacturing environments. Commercial mobility systems include, for example, passenger and package/cargo/supply vehicles and similar devices used in warehouses, stores and transportation environments. Medical mobility systems include gait trainers, standers, exercisers and other devices used to provide physical therapy or assist mobility impaired individuals. Hence, the innovations described herein widely applicable and beneficial to many types of mobility systems.

Referring to FIGS. 1A-1F, one embodiment of a mobility vehicle 100 is illustrated in the form of a novel gait trainer. The mobility vehicle 100 includes various assemblies for user positioning, support and freedom of movement. These include, for example, adjustable lateral support 200, multi axial support 300, foldaway footplate 600, vertical suspension 1100, control input 1200 and center of gravity adjustment 1300. Mobility vehicle 100 also includes various assemblies for ease of accessory connect and disconnect including detachable mast coupling 500 and detachable support accessory coupling 700. Mobility vehicle 100 further includes various assemblies for portability and movement including frame folding mechanism 400, wheel hub system 800, caster wheel system 900, and caster swivel lock 1000.

Figure 2A:
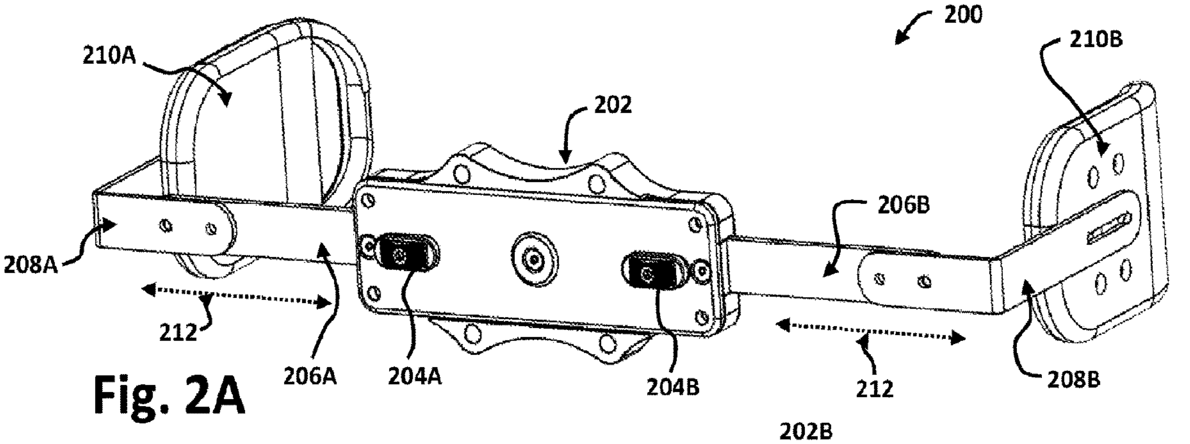
FIGS. 2A-2C illustrate one embodiment of a lateral support system.
Figure 2B:
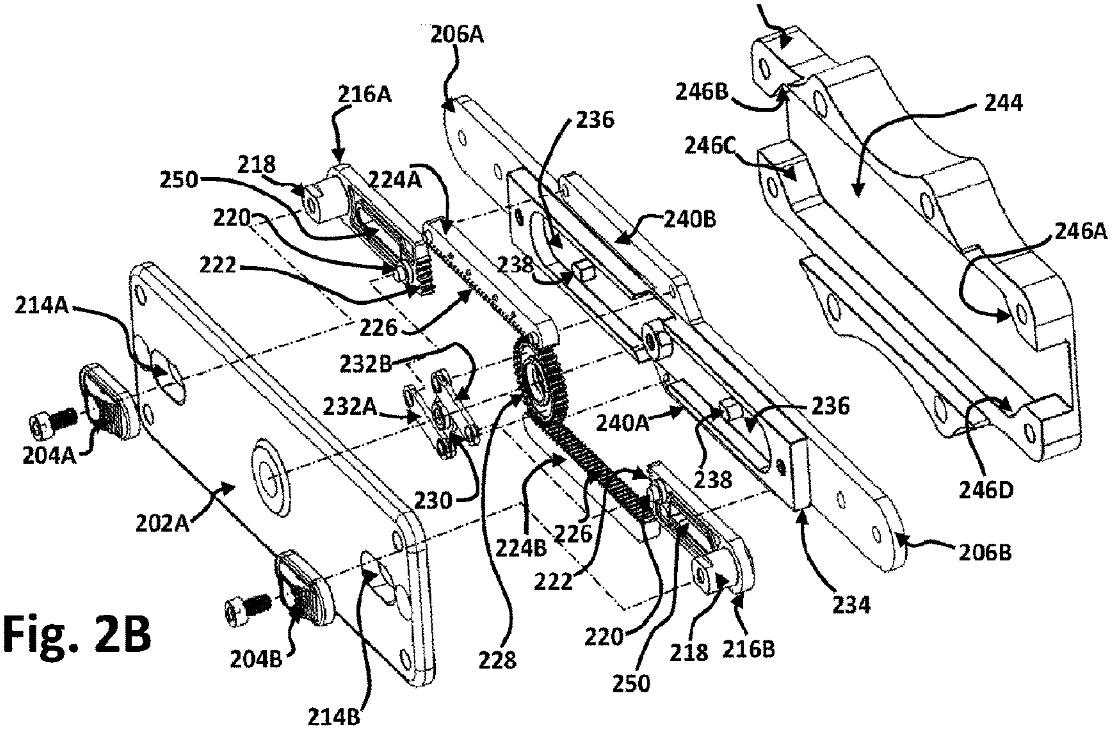
Figure 2C:
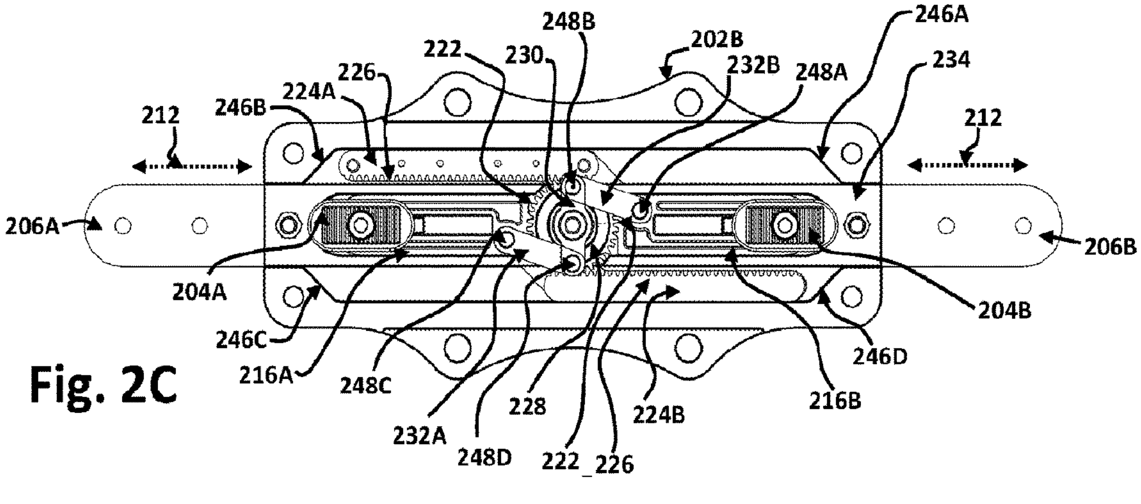
Figure 3A:
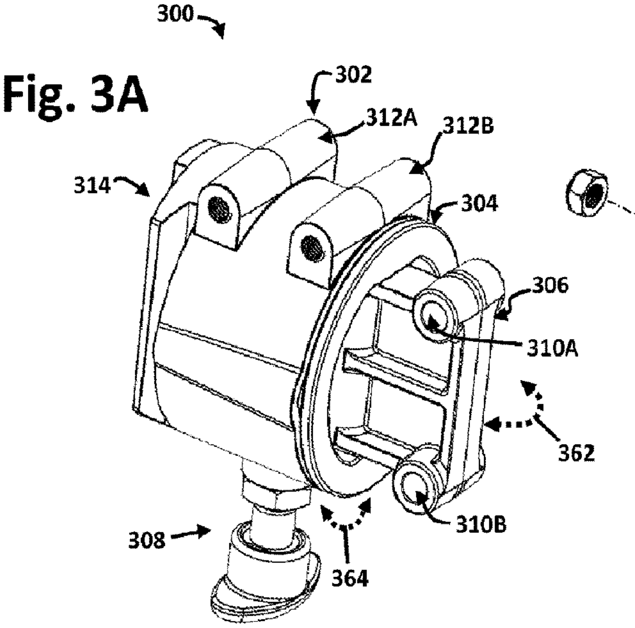
FIGS. 3A-3D illustrate one embodiment of a multi-axial support system.
Figure 3B:
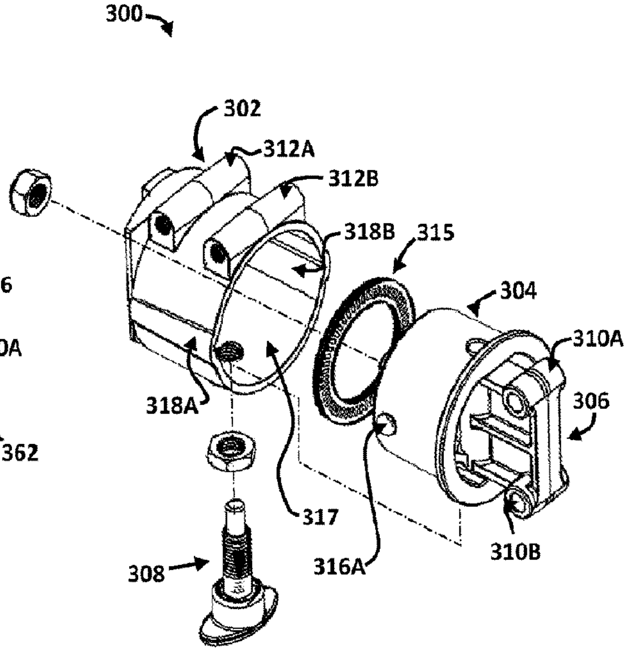
Figure 3C:
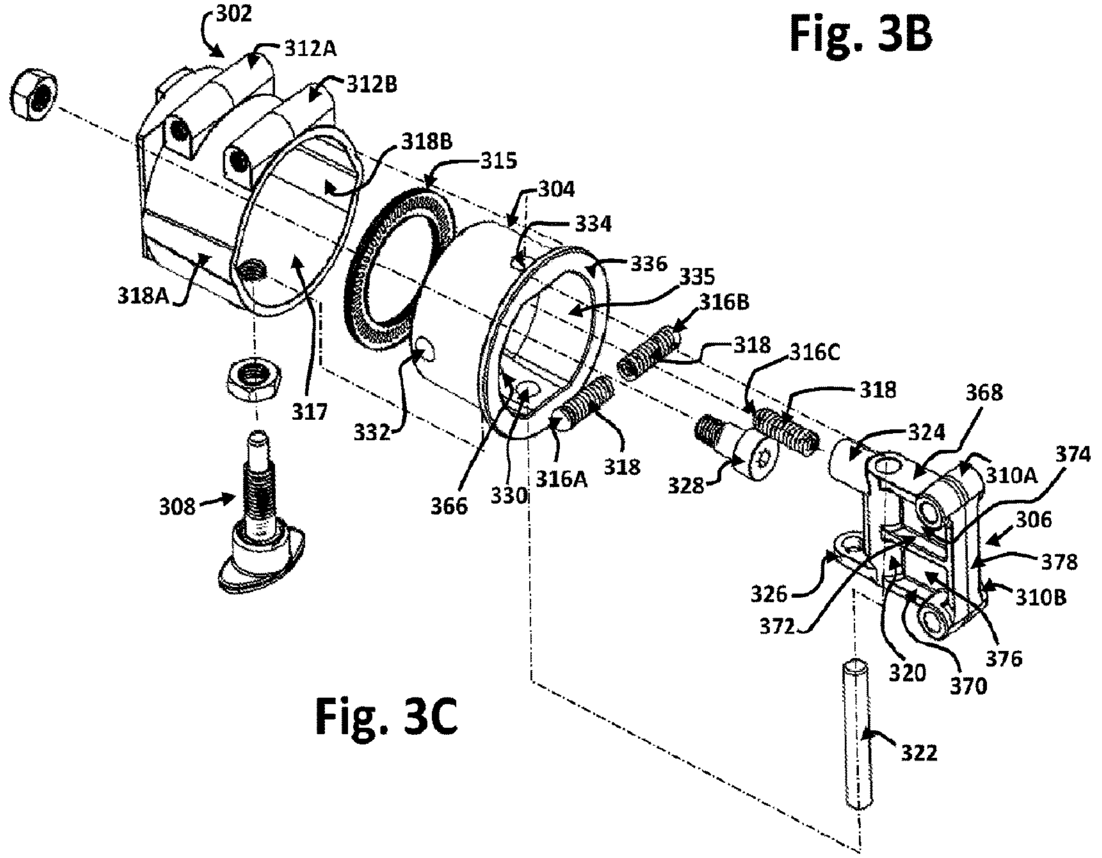
Figure 3D:
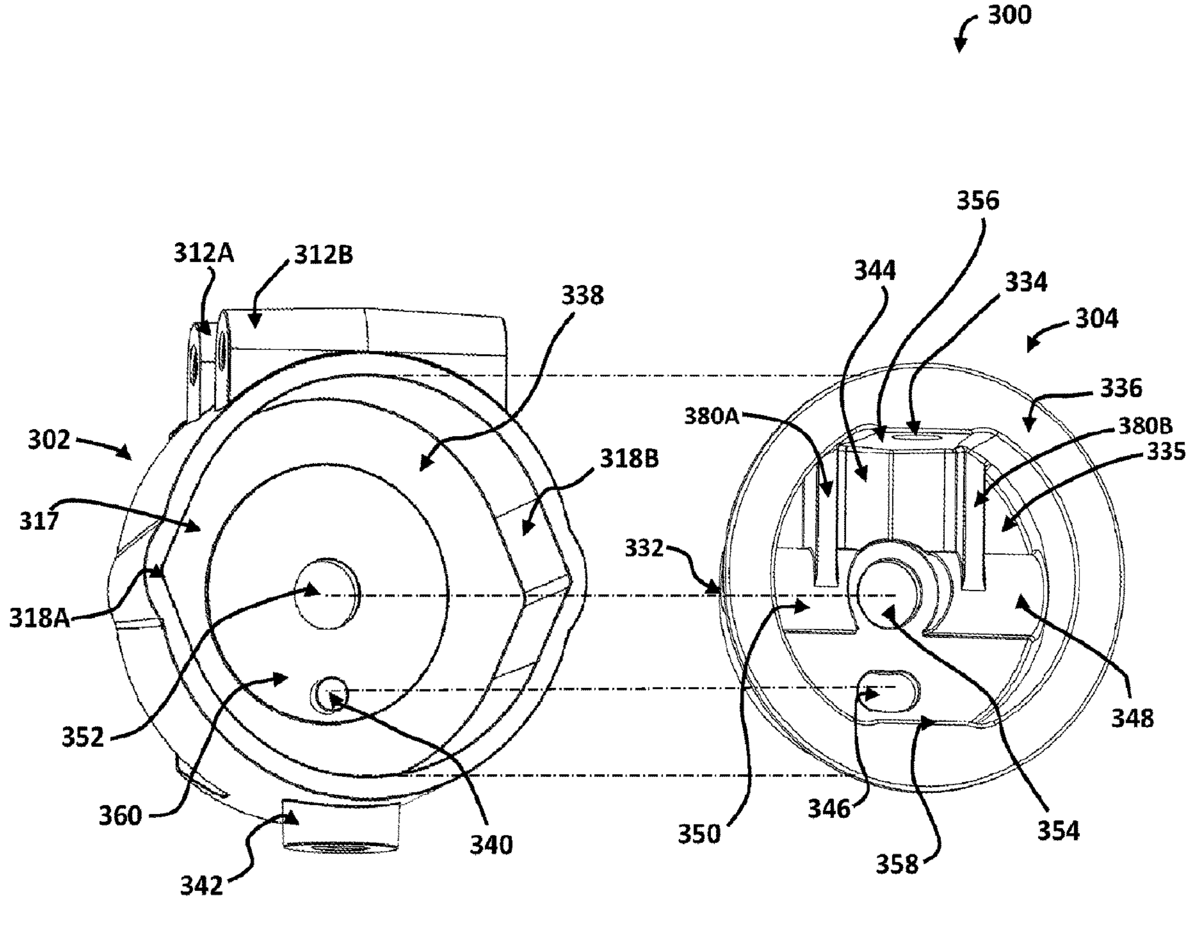

Referring now to FIGS. 1A-F and 2A-2C, the adjustable lateral support 200 will be described in more detail. As shown in FIGS. 1A-F, adjustable lateral support 200 forms a space in which the gait user's sides are supported (if necessary). Lateral support 200 is adjustable to properly accommodate the particular size of the gait user. As shown in FIGS. 2A-2C, one embodiment of the adjustable lateral support 200 includes a housing 200, which may be formed of housing portions 202A,B. Housing 200 includes apertures for mounting the lateral support to the body of the gait trainer.

Lateral support 200 also includes slide buttons 204A,B, brackets 206A,B and 208A,B, and support pads 210A,B. Slide buttons 204A,B are used to unlock the adjustable lateral support 200 so the distance between support pads 210A,B can be adjusted based on the size of the gait trainer user. Unlocking lateral support 200 allows brackets 206A,B and 208A,B to move closer or further way from each other as indicated by arrows 212. Slide buttons 204A,B can be spring-biased to automatically lock the lateral support from adjustment when slide buttons 204A,B are released.

Slide buttons 204A,B are mounted to releasable lock bodies 216A,B via apertures 214A,B in housing portion 202A. Apertures 214A,B are sized or dimensioned to allow slide buttons 204A,B (or portions thereof) to move or slide within the apertures. Bodies 216A,B have a first end portion with slide button mounting projections 218 for connection to slide buttons 204A,B. Bodies 216A,B also have a second end portion with linkage pivot joints 220. An opening 250 resides between the button mounting projection 218 and pivot joint 220. A toothed or geared portion 222 is also provided on bodies 216A,B. Toothed portion 222 is shown slighted curved or arched to match or intermesh with the toothed portion of gear 228. When the toothed portion 222 of bodies 216A,B intermeshes with gear 228, the lateral support is locked and cannot be adjusted. When toothed portion 222 of bodies 216A,B is released from gear 228 via slide buttons 204A,B, the lateral support is unlocked and may be adjusted as shown by arrows 212.

Linear gears 224A,B having toothed portions 228 that intermesh with gear 228. Toothed portions 228 may extend partially or fully on linear gears 224A,B. Linear gears 224A,B are further connected to brackets 206A,B via extensions 240A,B. Brackets 206A,B are identically constructed. Thus, movement or rotation of gear 228 correspondingly moves linear gears 224A,B and brackets 206A,B in the direction of arrows 212.

A guide body 234 is provided for releasable lock bodies 216A,B. Guide body 238 includes recesses 236 that receive lock bodies 216A,B and guide their movement. Guide body 238 also includes projections 238 in recesses 236. Projections 238 are received in openings 250 of lock bodies 216A,B. Projections 238 serve to limit the range motion (or act as stops) for lock bodies 216A,B by bearing against the outer wall of openings 250. The range of motion of lock bodies 216A,B is also limited by the outer wall of recesses 236, which may be formed of complementary shape. For example, the end portion of each lock body 216A,B is rounded and each recess 236 can include a similarly rounded portion to receive the lock body act as a physical top on the range of motion. Configured as such, guide body 234 guides the range of motion of releasable lock bodies 216A,B so they can linearly engage and disengage from central gear 228.

Housing portion 202B includes a recess 244 for receiving guide body 234 and brackets 206A,B. The recess's outer wall includes wall portions 246A-D which act as physical stops to limit the range of motion of brackets 206A,B via their extensions 240A,B. The stop or limit is accomplished when extensions 240A,B bear against or contact wall portions 246A-D. For example, the linear range of motion of extension 240A (and therefore bracket 206A) is limited by wall portions 246C,D. Similarly, the linear range of motion of extension 240B (and therefore bracket 206B) is limited by wall portions 246A,B.

Adjustable lateral support 200 further includes a linkage assembly allowing user actuation of one slide button 204A,B to also act as actuation of the other slide button. This allows for one handed operation to unlock the adjustable lateral support for adjustment. For example, sliding movement of button 204A also causes sliding movement of button 204B via the linkage assembly. In this manner, the other hand of a user or therapist is free to grab one of the support brackets 206A,B and/or 208A,B (and/or support pad 210A, B) make adjustments as shown by arrows 212.

The linkage assembly includes linkages 230 and 232A,B. Linkage 230 forms a hub linkage having a body with a central mounting aperture and extensions having pivot joints 248B,D or apertures for forming such joints. Hub linkage is rotatably mounted through its central aperture to guide body 234. Linkages 232A,B have bodies with pivot joints 248A,C or apertures for forming such joints. Linkages 232A,B are pivotably joined to hub linkage 230 at pivot joints 248B,D and to lock bodies 216A,B at pivot joints 248A,C. In operation, movement of either slide button 204A,B causes movement of its corresponding lock body 216A,B, which causes movement of its corresponding linkage 232A,B. Movement of linkage 232A (for example) causes hub linkage 230 to rotate, which correspondingly causes movement of linkage 232B. Thus, linkages 230 and 232A,B move in unison thereby causing lock bodies 216A,B to move in unison. This unified action allows movement of one slide button 204A,B to effectively move both lock bodies 216A,B freeing up central gear 228 to rotate so support brackets 206A,B can be adjusted in or out. By only having to move one slide button 204A,B (instead of both), only one hand is necessary for unlocking the adjustable lateral support structure leaving the other hand free to extend or retract the lateral support brackets and pads.

Referring now to FIGS. 1A-F and 3A-3D, the multi-axial support 300 will be described in more detail. As shown in FIGS. 1A-F, multi-axial support 300 provides a structural connection between the primary framework or structure of the gait trainer (like mast and vertical suspension system 1100) and supportive accessories for the gait trainer user's hip, back, and/or seat pad). Multi-axial support 300 allows natural oblique and axial movement of the pelvis while walking that would otherwise be encumbered or restricted by the supportive accessories being mounted rigidly to the structure of the gait trainer. The two-axis radial motion provided by multi-axial support 300 more accurately follows the natural motion of the human body in gait.

As shown in FIGS. 3A-3D, one embodiment of multi-axial support 300 includes bodies 302, 304 and 306. Mounting body 302 receives rotating body 304 and rotating body 304 receives pivoting body 306. Pivoting body 306 includes mounting bores or apertures 310A,B for mounting supportive accessories for the gait trainer user's body. So arranged, rotating body 304 rotates as shown by arrows 364 providing a first degree of axial movement/rotation and pivoting body 306 rotates or pivots as shown by arrows 362 providing a second degree of axial movement/rotation. In this manner, two axis radial motion is provided to any mounted supportive accessories. A spring-loaded locking plunger 308 is also provided to lock multi-axial support 300 from any radial motion.

Mounting body 302 is generally cylindrical and has an inner recessed space 317 also generally cylindrical and receiving body 304. Body 302 also includes a pair of mounting bores or holes 312A,B for mounting accessories such as trays, backrests, headrests, armrests, etc. that generally do not need to follow the motion of the human body in gait. Mounting body 302 further includes an attachment/mounting portion 314 for attaching body 302 to the supportive structure of the gait trainer.

Recessed space 317 of mounting body 302 receives bearing assembly 315 that is seated in a recessed back wall 338. Bearing assembly 315 can be in the form of a thrust bearing or other suitable bearing for allowing bodies 302 and 304 to rotate relative each other. Mounting body 302 also includes channels 318A,B, which may be V-shaped or other similar shape. Channels 318A,B operate with spring-loaded (318) ball bearings 316A,B to provide a spring defaulted for return-to-center and/or resistance for rotating body 304. Balls 316A,B and associated springs 318 reside in cylindrical chambers 348 and 350 in the recessed space 335 of rotating body 304. Cylindrical chambers 348 and 350 radially extend from a central portion of recessed inner space 335 to the outer cylindrical wall rotating body 304.

Rotating body 304 also includes apertures 332 exposing balls 316A,B residing in chambers 348 and 350. Apertures 332 (and hence balls 316A,B and associated springs 318) are located proximate the rear closed portion of rotating body 304 with acutely within recessed space 335. Apertures 334 (and hence balls 316A,B and associated springs 318) also arranged approximately 180° apart relative to the cylindrical shape of rotating body 304. Other arrangements are also possible including different angular displacements.

In operation, balls 316A,B are normally seated against the vertex/apex of the V-shaped channel (i.e., return-to-center position). As body 304 rotates, balls 316A,B bear against one of the legs of the V-shaped channels. This causes balls 316A,B to recess inward into body 304 from ball apertures 334 and against the pressure of springs 318, which begins to add a degree of resistance to the rotational movement. Also, when balls 316A,B first encounter the outer portion of channels 318A,B, they will tend to urge or guide rotating body to its return-to-center position by allowing the balls to move down the legs of the channel toward the vertex/apex of the channel.

Channels 318A,B may be larger or smaller than shown depending on when a return-to-center effect is desired to start. Channels 318A,B may also be tapered to allow for easier assembly of rotating body 304 into mounting body 302. For example, as shown, channels 318A,B may be wider near the open end of mounting body 302 and narrower near the closed end of body 302. Such an arrangement makes it easier for balls 316A,B to locate the channels 318A,B upon initial insertion of rotating body 304 into mounting body 302.

Mounting body 302 further includes a projection 340 that is received within aperture or opening 346 and rotating body 304. Projection 340 may be a pin, cylinder, or any other suitable projecting member or shape. Projection 340 extends from wall portion 360, which can be raised or extending from back wall portion 338. Projection 340 is located a radial distance away from axial mounting aperture 352, which receiving mounting fastener 328. In other embodiments, projection 340 can be located at other radial distances closer or further away from that shown.

Opening 346 in rotating body 304 is curved or arcuate in one embodiment and arranged to receive projection 340. Opening 346 is curved or arcuate in order to allow rotating body 304 to rotate through the curved or arc of opening 346. During rotation of body 304, projection 340 limits the rotational body 304 by making contact with the end portions of curved opening 346. When rotating body 304 is in the center (or return-to-center) position, projection 340 is located in the proximate center of curved opening 346.

As body 304 rotates, curved opening 346 axially rotates causing projection 340 to move from its center position towards one side or the other of curved opening 346. The rotation of body 304 is limited to when projection 340 makes contact with the end walls at one end or the other of curved opening 346. Opening 346 can be sized (e.g., in arcuate length) to match the size of channels 318A,B (e.g., also in arcuate length across the opening of the legs of the V-shaped channel). In other embodiments, curved opening 346 can be sized larger or smaller than the size of channels 318A,B. In other embodiments, projection 340 can be located on rotating body 304 and curved opening 346 can be located on mounting body 302. In yet other embodiments, either of mounting apertures 352 or 354 can include an arcuate slot cutout for receiving a projection or extension to reside within to accomplish the same result (e.g., rotational motion limits) as projection 340 and curved opening 346. Mounting body 302 further includes an aperture projection 342 for mounting lock plunger 308, which selectively locks the body 304 from rotating via an aperture or opening in rotating body 304 that receives the locking pin from lock plunger 308.

Inner recessed space 335 of body 304 receives and moveably mounts pivot body 306. Pivoting body 306 includes an axial mounting cylinder 320 having a bore or hole for receiving pin or shaft 322. Shaft 322 forms the axis about which body 306 pivots. Shaft 322 is secured in shaft apertures 330 and 334 and rotating body 304. The inner recessed space 335 of rotating body 304 includes flattened and raised wall sections 356 and 358 having the shaft apertures 330 and 334. Wall sections 356 and 358 provide structural support to rotating body 304 where pivoting body 306 is connected thereto.

Extending from mounting cylinder 320 is a first portion having mounting holes 310A,B. This first portion includes top and bottom lateral supports 368 and 370 and intermediate lateral support 372. Between these lateral supports are vertical supports 374, 376, and 378. Vertical support 378 extends between mounting holes 310A,B and is joined, connected, extending from or formed with lateral support 372 and vertical supports 374 and 376. So arranged, each of these supports (except 378) extend from central mounting cylinder 320 to provide structural support for accessories attached to mounting holes 310A,B.

Pivoting body 306 also includes a second portion that includes cylindrical mounting chamber 324. Ball bearing 316C and associated spring 318 are seated and contained within cylindrical mounting chamber 324. Cylindrical mounting chamber 324 extends from mounting cylinder 320 proximate one end thereof (e.g., upper end). Ball 316C and associated spring 318 arranged to work with channel 344 (which can be V-shaped) in rotating body 304 (see FIG. 3D) in the same way balls 316 A,B are configured to work with channels 318 A,B to provide a return-to-center arrangement and function between mounting body 302 and rotating body 304. In this case, the return-to-center arrangement and function is between pivoting body 306 and rotating body 304 whereby pivoting body 306 is returned to its center position. For example, in the default center position, ball 316C is located at the vertex/apex of the V-shaped channel 344. When pivot body 306 moves, ball 316C will leave the vertex/apex of the channel 344 and begin to ride against one of the legs of the V-shape, as described previously in the context of balls 316A,B and channels 318A,B and which is hereby incorporated by reference.

The movement of pivoting body 306 is limited by walls 380A,B, which are proximate the ends of channel 344. The end of movement occurs when ball bearing 316C (or cylindrical chamber 324) encounters walls 380A or B or proximity thereto such as by the vertex/apex form by walls 380A,B and the ends of channel 344. In other embodiments, the end of movement can be accomplished similar to the pin 340 and arcuate opening 346 arrangement described earlier whereby a pin may be located on either pivoting body 306 or rotating body 304 and a curved aperture located on the other (or vice versa).

Pivoting body 306 includes a further extension 326 having an aperture therein. Extension 326 is arranged so that it's aperture selectively receives the pin of lock plunger 308 to lock pivoting body 306 from motion. So arranged, pin of lock plunger 308 extends through apertures in mounting body 302, rotating body 304, and pivoting body 306 thereby locking each of these bodies for movement relative to each other.

So configured, rotating body 304 rotates as shown by arrows 364 providing a first degree of axial movement/rotation and pivoting body 306 rotates or pivots as shown by arrows 362 providing a second degree of axial movement/rotation. In this manner, two axis radial motion is provided to any mounted supportive accessories to better mimic the human body's motion in gait.

Referring now to FIGS. 1A-F and 4A-4H, the frame folding assembly 400 will be described in more detail. As shown in FIGS. 1A-F and 4H-4H, frame folding assembly 400 provides a framework of primary and bracing elements that can be folded for the purpose of storage, shipping, or local transport. Assembly 400 also provides the ability to lock the framework in either folded or unfolded state. In frame folding assembly 400 includes a first frame portion having side frame members 402 and 404 and a cross frame member 406. A second frame portion has supports 408 and 410 that are connected to the first portion via pivot joints 412 and 414. If third frame portion is provided and includes a mast member 416 that is connected to cross frame member 404 at pivot joint 420. A clamping mechanism 418 is also provided connecting mast member 416 to support members 408 and 410.

Mast member 416 includes a track 422 extending at least partially along its length and optionally during its entire length. Track 422 can take the shape of a recessed channel or groove or other shape permitting sliding or similar movement of clamping mechanism 418. In one embodiment, track 422 includes lock apertures 424 and 426. Lock apertures 424 and 426 are located within groove 422 to provide locations where clamping mechanism 418 can be mechanically locked in position. These positions include, for example, a folded frame position (e.g., as represented by lock aperture 426) and an unfolded position (e.g., as represented by lock aperture 424). Additional apertures may be provided within track 422 to mechanically lock the frame in intermediate positions.

Clamping mechanism 418 rides within groove 422 and includes, in one embodiment, a body 428 having a clamping handle mounting portion 430, support member mounting space 432, lock mounting portion 434, and clamping member 436. Clamping handle mounting portion 430 includes a cylindrical bore or hole through which shaft 444 extends. Shaft 444 is connected to clamping handle 438 at one end of its shaft body and to clamping member 436 at the other end of its shaft body. Shaft 444 can be moved within mounting portion 430 via movement of handle 438. Handle 438 has a rounded and cammed end 439 in contact with mounting portion 430. As handle 438 rotates from the position shown, the rounded and cammed end 439 in contact with mounting portion 430 causes shaft 444 to move further into mounting portion 430. This causes clamping member 436 to move away from clamping body 428 and, to in effect, loosen or unclamp the clamping mechanism. Handle movement in the opposite direction draws shaft 444 partly from mounting portion 430 and causes clamping member 436 to move closer to clamping body 428 and to, in effect, tighten or clamp the mechanism against mast member 416.

Clamping member 436 includes an elongate body having end portions 450 and 452. In one embodiment, end portions 450 and 452 are tapered (as shown) to allow ease of assembly and disassembly, as well as sliding motion of the clamping member 436 in track/groove 422. Any form of tapering can be provided including, for example, rounded, triangular, polygonal, etc. Elongate body of clamping member 436 also includes base portion 456 and extension portion 454. Extension portion 454 is elongate and narrower than base portion 456. This allows the wider areas of base portion 456 alongside extension portion 454 to press up against the inner surfaces of track/groove 422 during clamping to immobilize clamping member 436 in its location in track/groove 422. Elongate body of clamping member 436 also includes at least first and second apertures 458 and 460 for receiving and affixing to clamping shaft 444 and a mounting shaft 462. Apertures 458 and 460 are located proximate the end portions 450 and 452, but may also be located at other positions on clamping member 436.

Locking plunger 440 includes a knob 441 and spring-biased locking pin 442. In one embodiment, locking pin 442 is spring-biased to extend out of clamping mechanism 418 so as to automatically engage into locking apertures 424 and 426 in track/groove 422 when these apertures are encountered. Locking pin 442 is withdrawn from locking apertures 424 and 426 by pulling on knob 441. In this manner, these mechanically locked locations at apertures 424 and 426 are provided at either end of clamping mechanism 418's range of traverse to provide greater ease of handling and transport, and to further provide a secure and rigid clamping at either end of the range of traverse, where sliding movement would be undesirable.

Figure 4A:
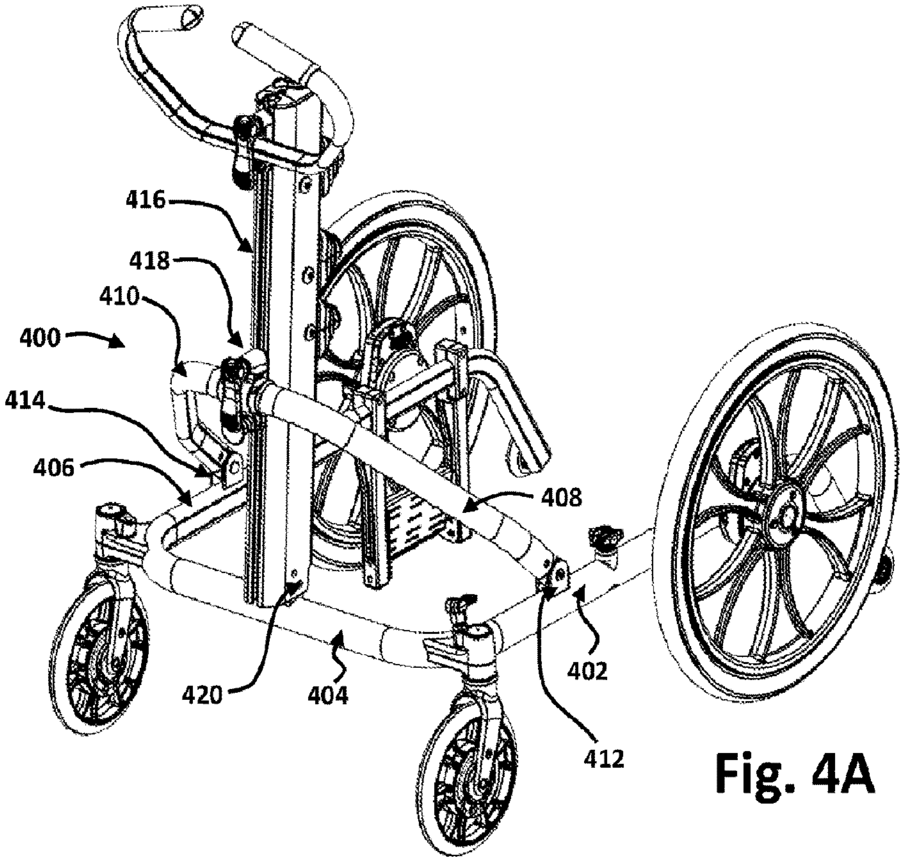
FIGS. 4A-4H illustrate one embodiment of a frame folding arrangement.
Figure 4B:
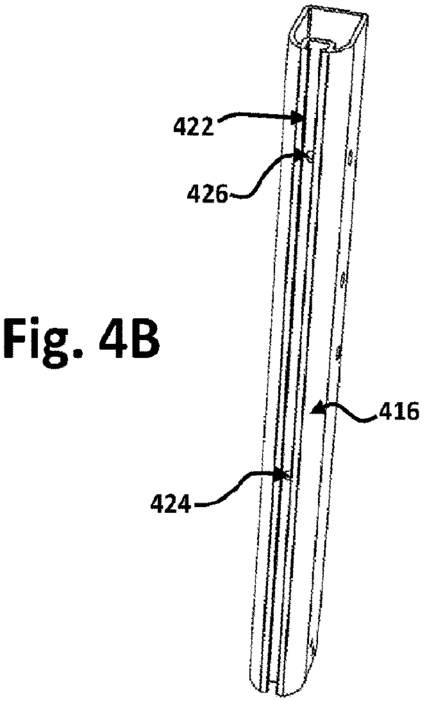
Figure 4C:
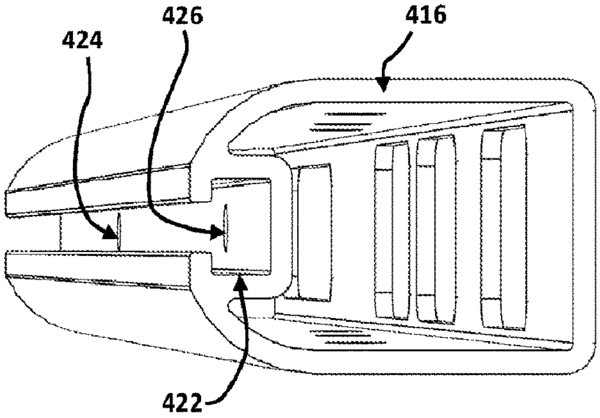
Figure 4D:
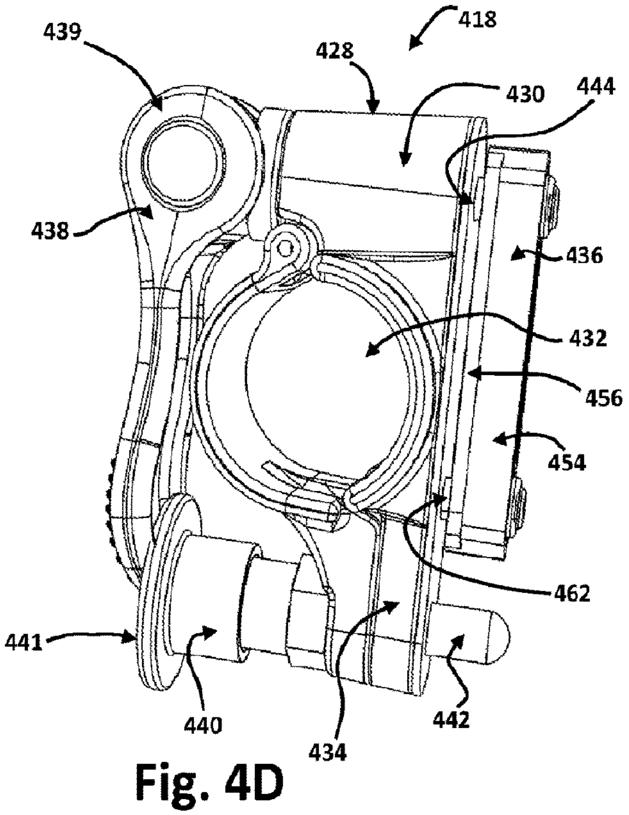
Figure 4E:
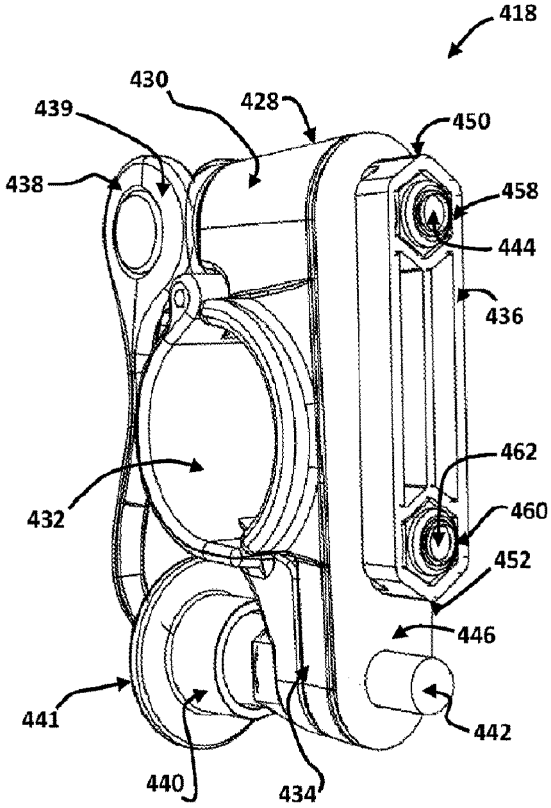
Figure 4F:
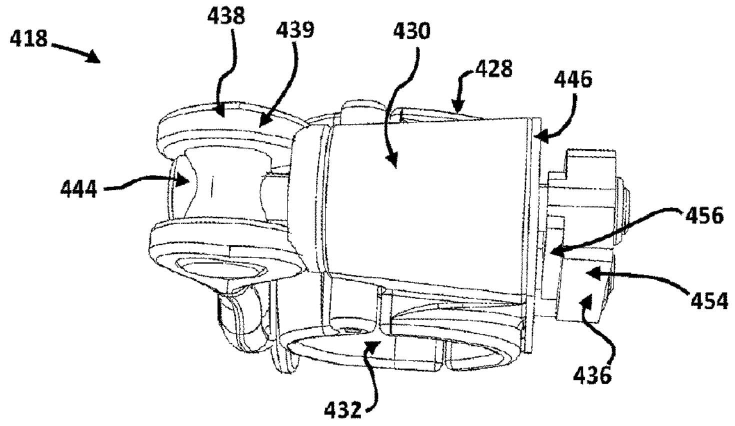
Figure 4G:
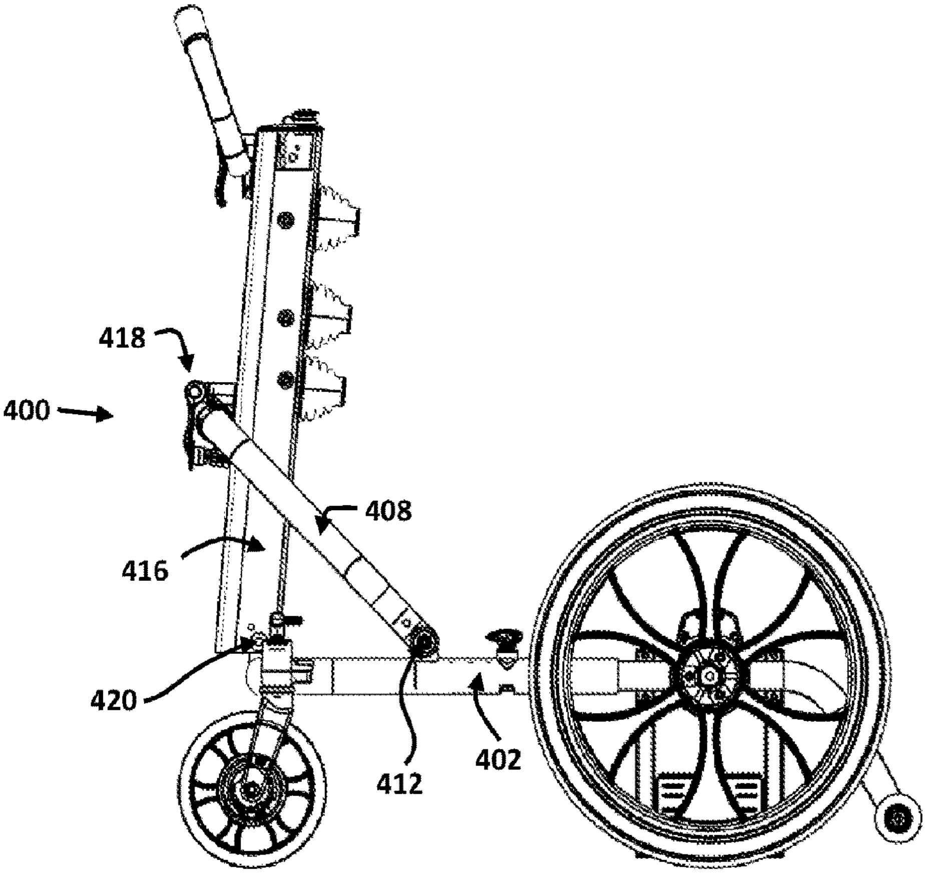
Figure 4H:
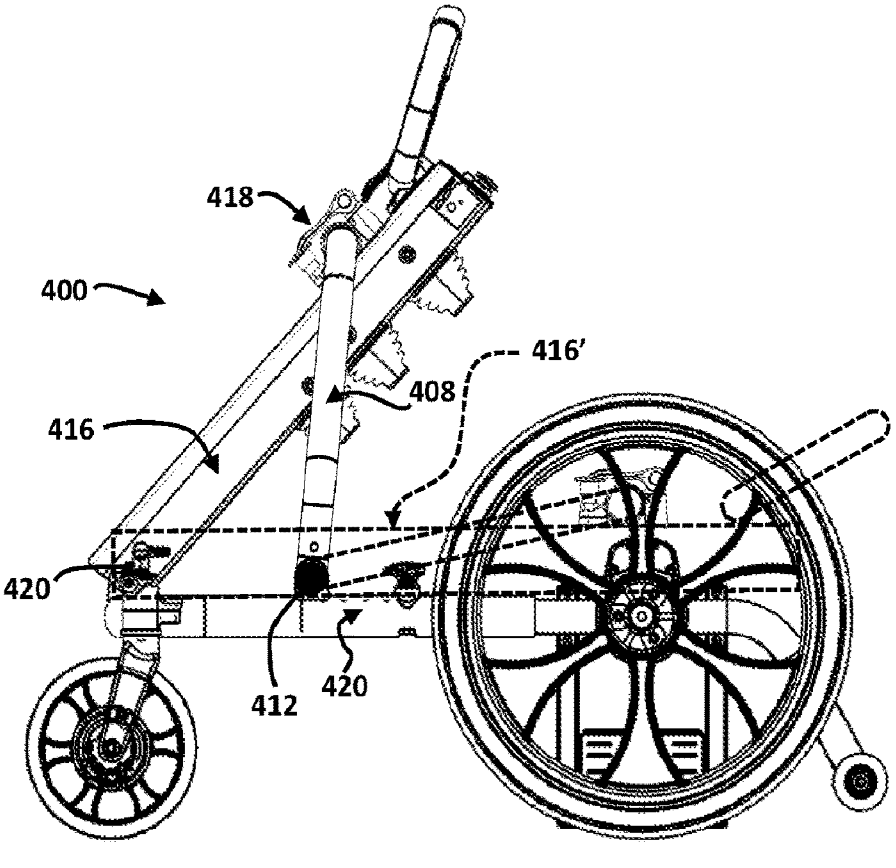

FIGS. 4G and 4H are partial side elevational views showing a gait trainer's mast member 416 and frame members in folded (FIG. 4H) and unfolded positions (FIG. 4G). FIG. 4G can be an example of when the frame is unfolded and clamping mechanism 418 is engaged into mechanical locking aperture 424. FIG. 4H can be an example of when the frame is folded and clamping mechanism 418 is engaged into mechanical locking aperture 426. During folding, mast member 416 pivots about pivot connection 420 and supports 408 and 410 pivot about pivot connections 412 and 414. These pivot connections may be formed by, for example, a clevis fastener or similar type of arrangement. As shown in FIG. 4H, the length of mast member 416 (and corresponding location of locking aperture 426) can be chosen to allow for pivoting or folding to varying degrees including flat (e.g., 90 degrees (more or less) as illustrated by the position of mast member 416') or even further to facilitate folding, storage and/or transport.

Referring now to FIGS. 1A-F and 5A-5I, the detachable post coupling assembly 500 will be described in more detail. As shown in FIGS. 1A-F, coupling assembly 500 provides for the easy and secure attachment of equipment to the post or mast framework. In one embodiment, the coupling is composed of mating haves in a dovetailed lug (e.g., 314/524) and receiver (e.g., 504/516/520) configuration. The dovetail is provided by tapering the lug and receiver so that a funnel-like effect occurs requiring little alignment and coordination to begin the coupling operation. Once begun, the mating halves are effortlessly brought into full alignment and seated completely. Additionally, a stop feature (e.g., 524) is incorporated to prevent undesirable wedging or inadvertent binding of the joint or coupling. A spring plunger (e.g., 506/518/538) or other keyed or dowel-like feature may then lock the halves together in the sliding axis. Further, a draw-type of clamp (e.g., 510) secures a locking wedge or clamping member (e.g., 526) against the side of the dovetail element (e.g., 314) to secure the 2 halves without looseness.

FIGS. 5A-5I illustrate one particular embodiment of a coupling assembly 500. Assembly 500 includes a body 502 having a receiver portion 504, lock pin assembly 506, and lock clamp assembly 510. Body 502 includes a first recess 520 and second recess 516. First recess 520 is formed by side projections 512A,B and side recesses 514A,B. In one embodiment, first recess 520 is tapered having a wider upper portion 540 and a narrower lower portion 542 (see FIG. 5H). Thus, side projections 512A,B include end surfaces tapering recess 520 from wide to narrow. Similarly, side recesses 514A,B taper from wide to narrow by virtue of these and surfaces. In other embodiments, recess 520 does not have to be tapered or can include tapering greater or less than that shown and described herein. As described earlier, recess 520 provides a tapered receiver space facilitating easier alignment, end of travel and assembly of the mating halves of the coupling.

Second recess 516 is a further cavitation/recess in recess 520 and facilitates a stop feature in the coupling 500. The stop feature (e.g., 516/524) further facilitates end of travel and locking of the mating halves of the coupling 500. To facilitate end of travel, recess 516 is in the form of a second receiver space having a rounded end wall located a distance within recess 516 to stop any further insertion of the stop projection 524 and tapered mounting projection/lug 314. While a rounded surface is shown, any shape may be used so long as it stops further insertion.

Recess 516 further includes an aperture for lock pin 518. Lock pin 518 is part of lock pin assembly 506, and can be spring-biased 538 to allow lock pin 518 to retract from recess 516 (and stop projection 524) under spring pressure and then to extend into recess 516 (and stop projection 524) to achieve a lock. Body 502 includes a lock pin assembly mounting portion 508 to retain lock pin 518 and spring 538.

A lock clamp assembly 510 is also provided. In one embodiment, clamp assembly 510 includes a clamping member/wedge 526, shaft 532, and handle 534. Body 502 has a bore or chamber 536 in which clamping member/wedge 526 and shaft 532 extend into and through as shown. Clamping member/wedge 526 as a notch or cut 530 approximating the geometry of lug/mounting projection 314 for exerting a clamping pressure to lock the lug/mounting projection 314 in position. Clamping member/wedge 526 further includes a channel through which shaft 532 extends and connects to handle 534. Clamping member/wedge 526 may move along shaft 532 to an inward position (into body 502) to cause clamping and to a relatively outward position to release clamping. Movement of clamping member/wedge 526 on shaft 532 is caused by rotation of handle 534. Handle 534 is a clamping handle having a cammed surface proximate its connection to shaft 532. The cammed surface is in contact with clamping member/wedge 526 and as the cammed surface is rotated in one direction by handle 534, it exerts an increasing clamping pressure by pushing on clamping member/wedge 526. As the cammed surface is rotated in the other direction by handle 534, it exerts a decreasing clamping pressure on clamping member 526/wedge thereby releasing any clamping effect.

Figure 5A:
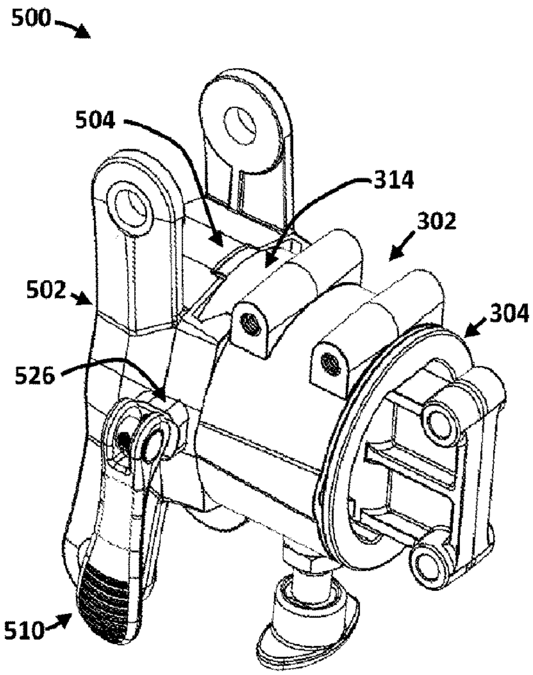
Figure 5B:
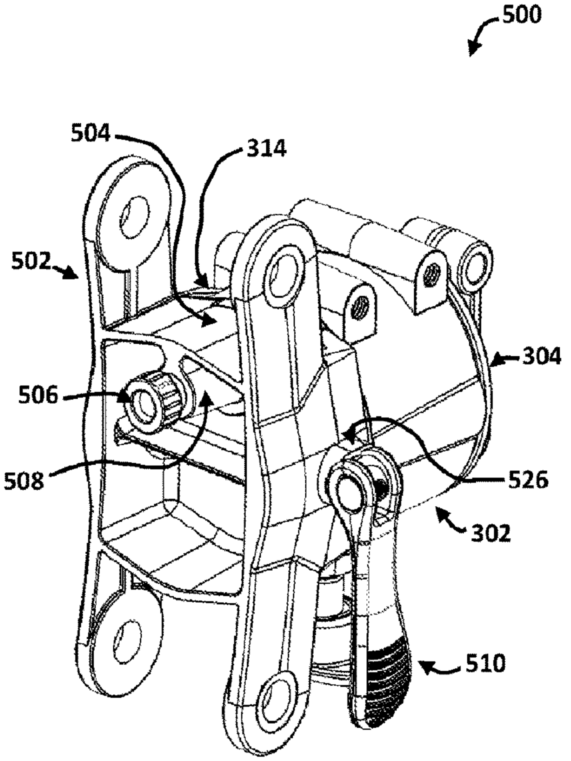
Figure 5C:
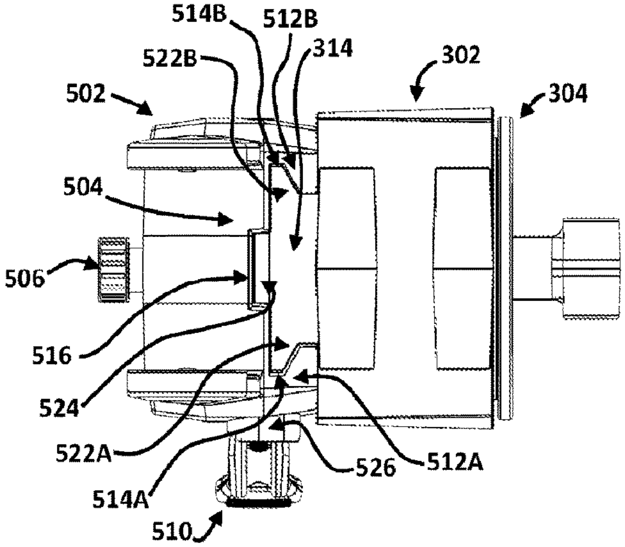
Figure 5H:
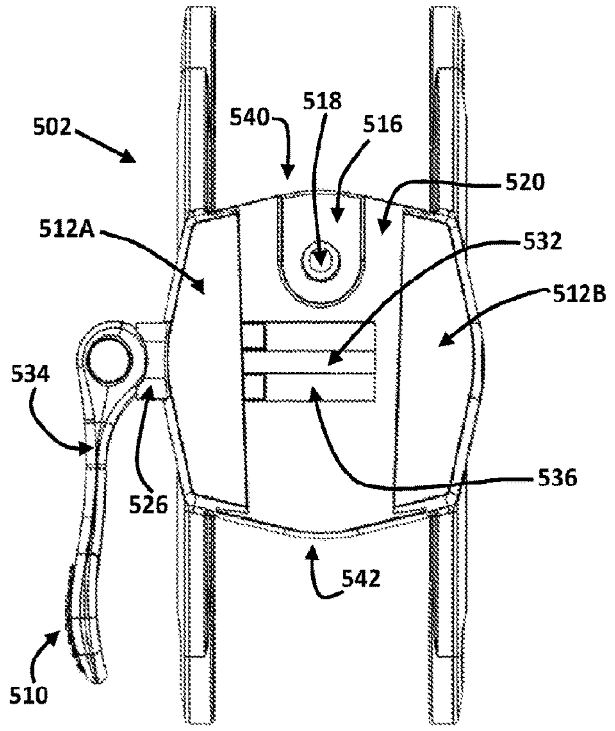
Figure 5I:
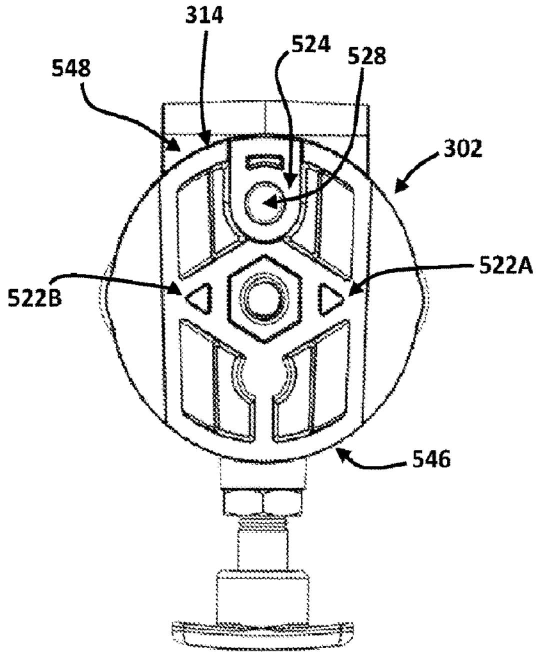

Mounting projection 314 acts as a lug to be received by recess 520. In one embodiment, mounting projection 314 includes projecting side portions 522A,B and stop projection 524. Projecting side portions 522A,B taper to provide mounting projection 314 a tapered profile having a wider upper portion 544 and a narrower lower portion 546 (FIG. 5I). Stop projection 524 includes an aperture 528 for receiving lock pin 518. Stop projection 524 works in conjunction with recess 516 to create a stop or an end of travel for the mounting projection 314 when it is inserted into recess 520 and lock pin 518 is inserted into aperture 528 to lock the halves of the coupling. The tapering of mounting projection 314 corresponds to the tapering of recess 520 in order to accomplish the dovetail providing the funnel-like effect for alignment and seating of the mating halves of the coupling. While dovetailing and tapering are described, any suitable guided alignment arrangement can be employed.

When the mating halves of the coupling 500 are aligned and seated, they can be locked in position by locking pin 518 and secured against looseness by lock clamp assembly 510. As previously described, locking is achieved by extending locking pin 518 through recess 516 and into aperture 528 of stop projection 524. Securing the mating halves against looseness is accomplished by draw-type lock clamp assembly 510. Through handle 534, clamping member/wedge 526 is moved into contact with projecting side portion 522A of mounting projection 314. In particular, notch 530 in clamping member/wedge 526 captures and presses against projecting side portion 522A. This causes opposite side projecting portion 522B to forcefully press against the walls of side recess 514B thereby eliminating any looseness between the mating halves of the coupling.

Referring now to FIGS. 1A-F and 6A-6C, the leg/footrest assembly 600 will be described in more detail. As shown in FIGS. 1A-F, leg/footrest assembly 600 can be part of a gait trainer device. One problem during gait training is that as fatigue and tiredness set in, relief in the form of a chair, bed, wheelchair, etc. may not be close by. It is not desirable for an attendant to leave the user standing unattended while a chair or cart is retrieved. Leg/footrest assembly 600 provides a foot platform or a pair of footrests incorporated into or attached to the gait trainer that can be deployed to offer a temporary platform on which to stand while the attendant rolls the gait trainer to a place suitable for the patient to sit or rest. In one embodiment, a hinged footrest is attached to the frame at either or both sides of the patient and can be folded out of the way during normal walking activity.

Figure 6A:
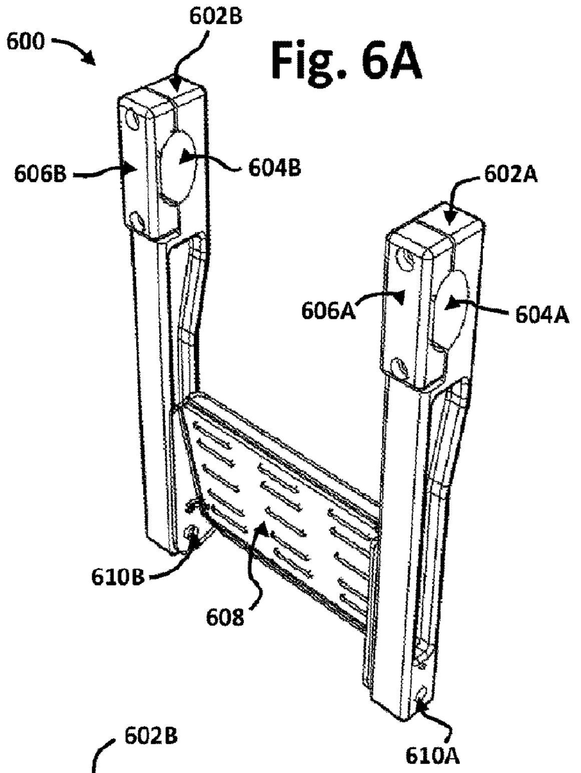
FIGS. 6A-6C illustrate one embodiment of a footplate system.
Figure 6B:
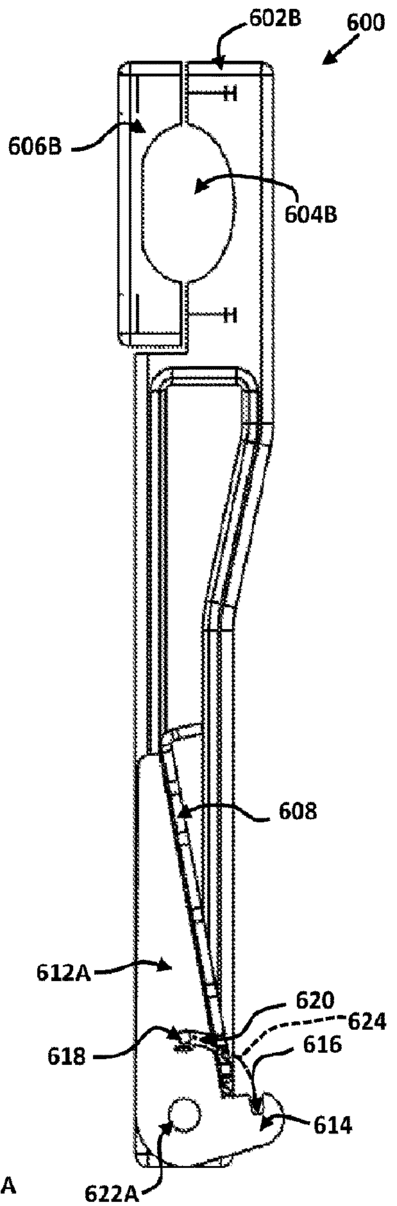
Figure 6C:
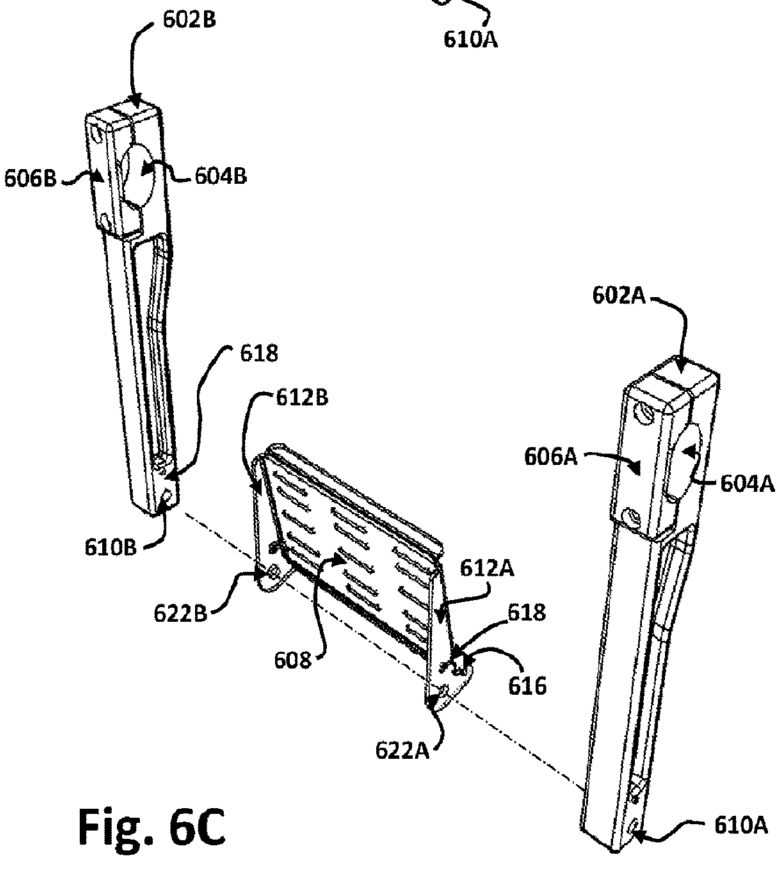
Figure 7A:
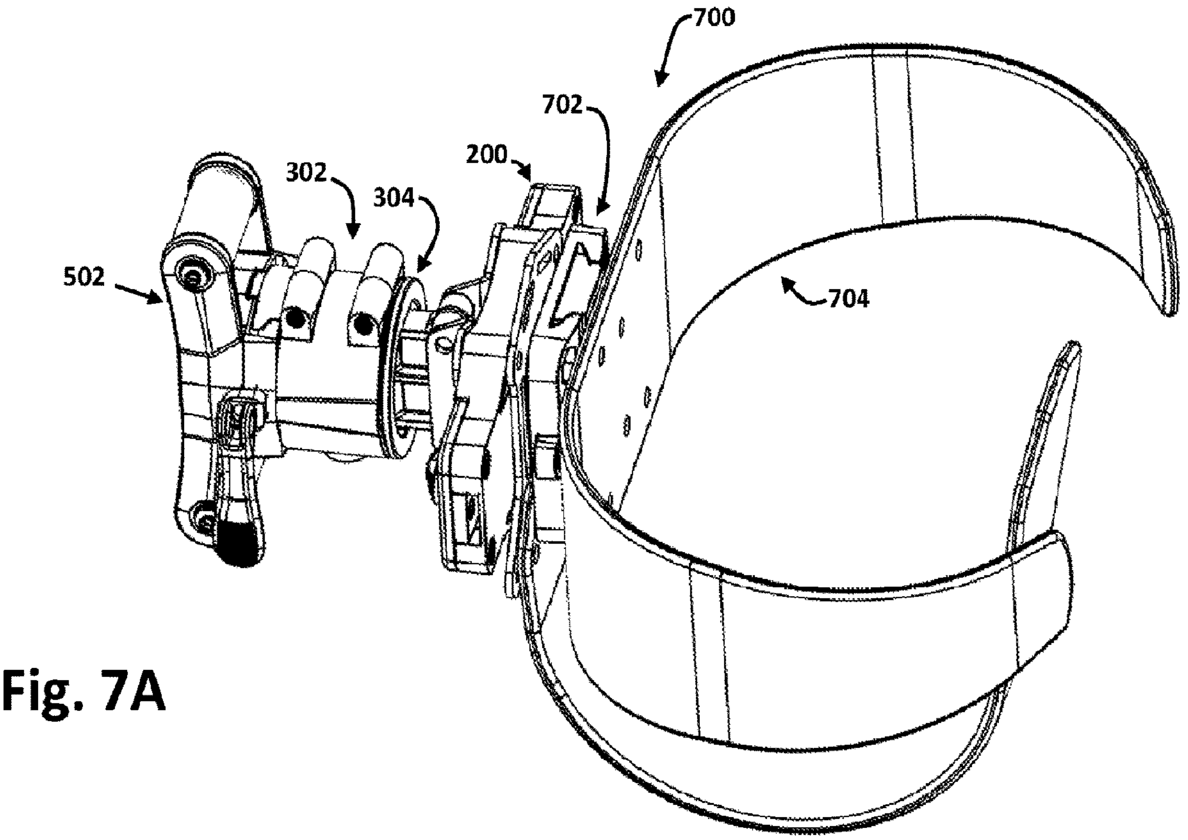
FIGS. 7A-7D illustrate one embodiment of a detachable accessory coupling.
Figure 7B:
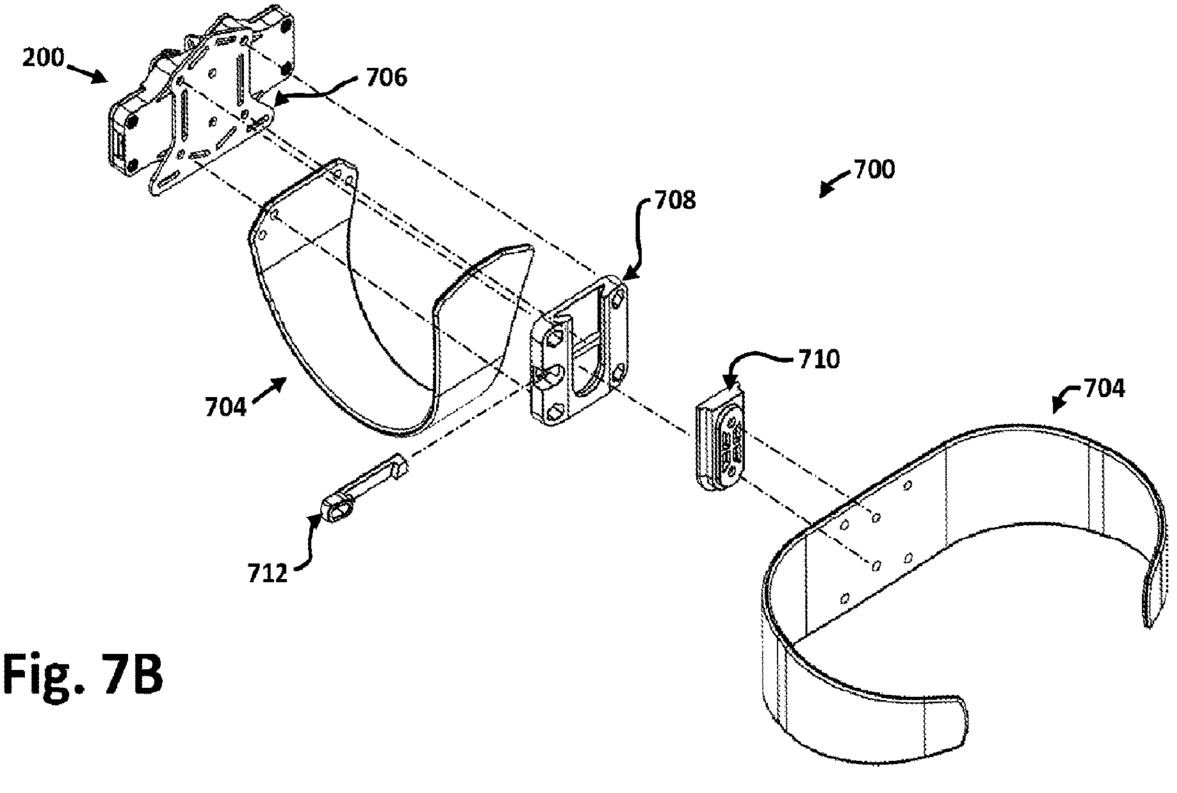
Figure 7C:
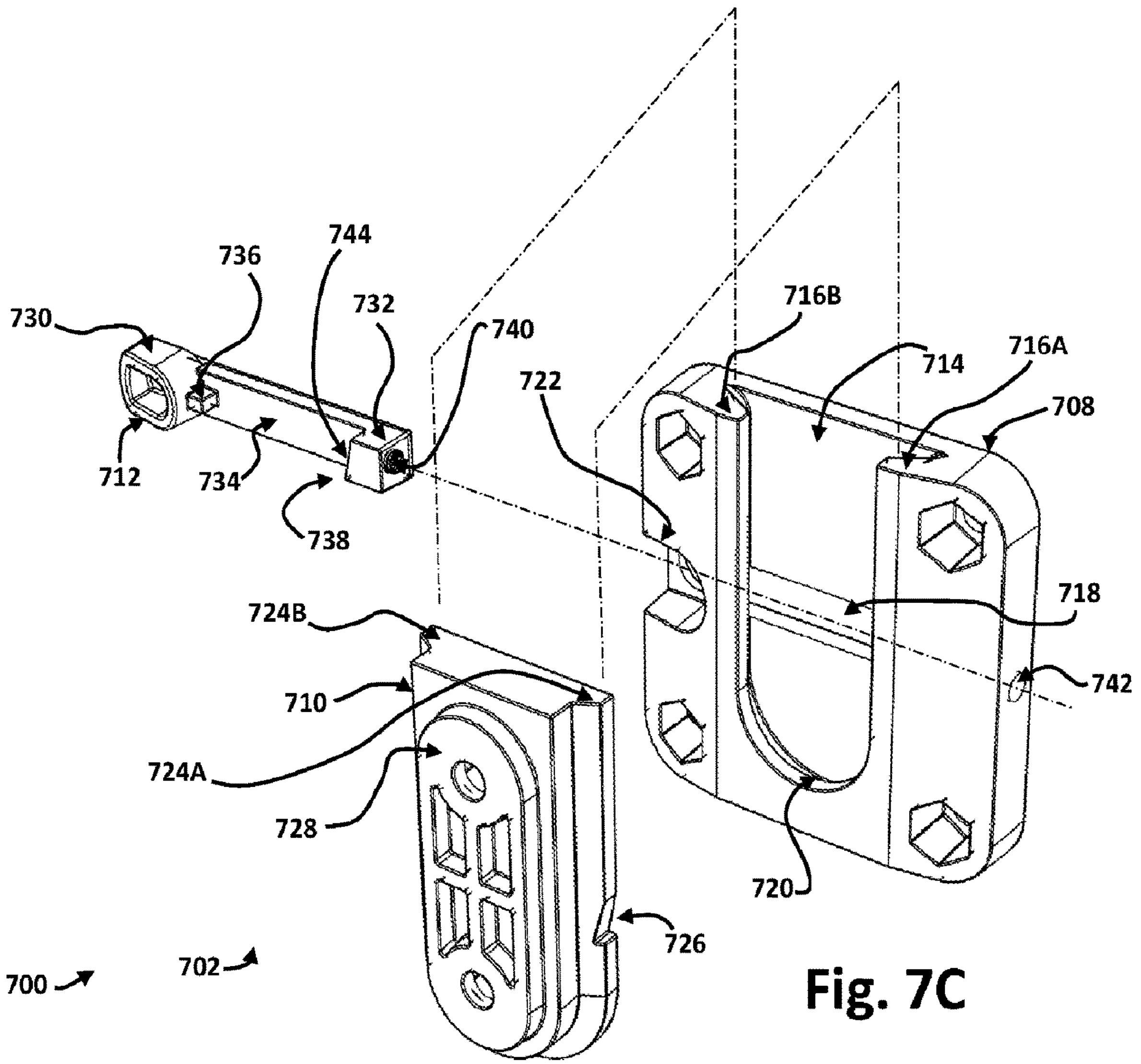
Figure 7D:
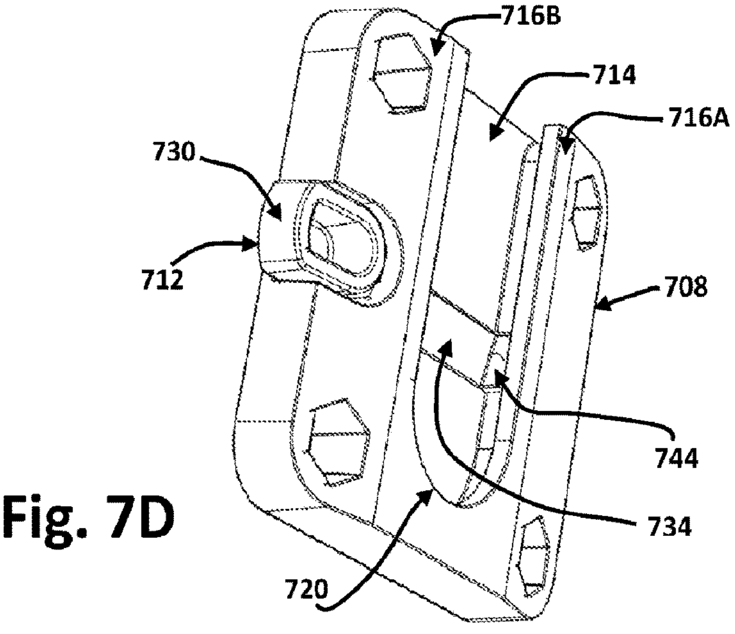
Figure 8A:
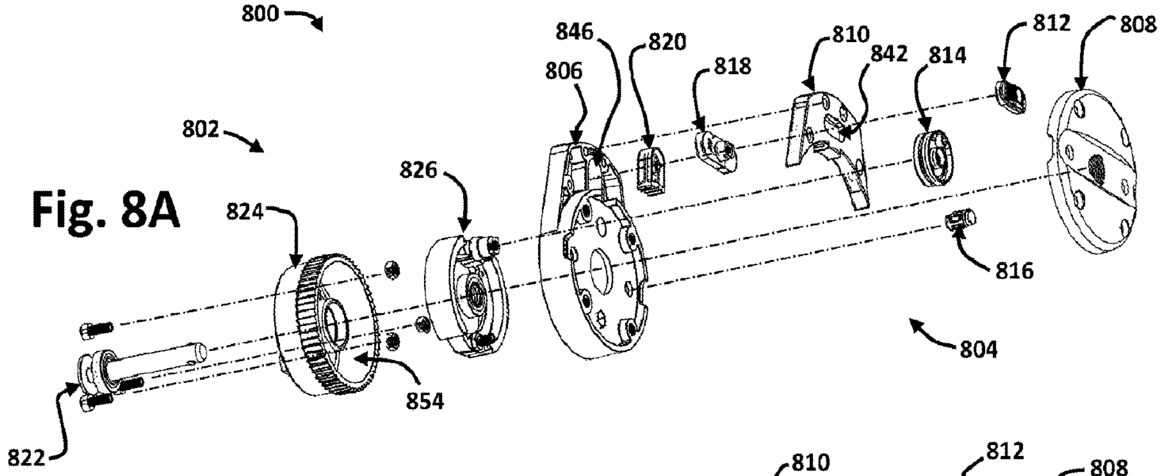
FIGS. 8A-8F illustrate one embodiment of a brake system.
Figure 8B:
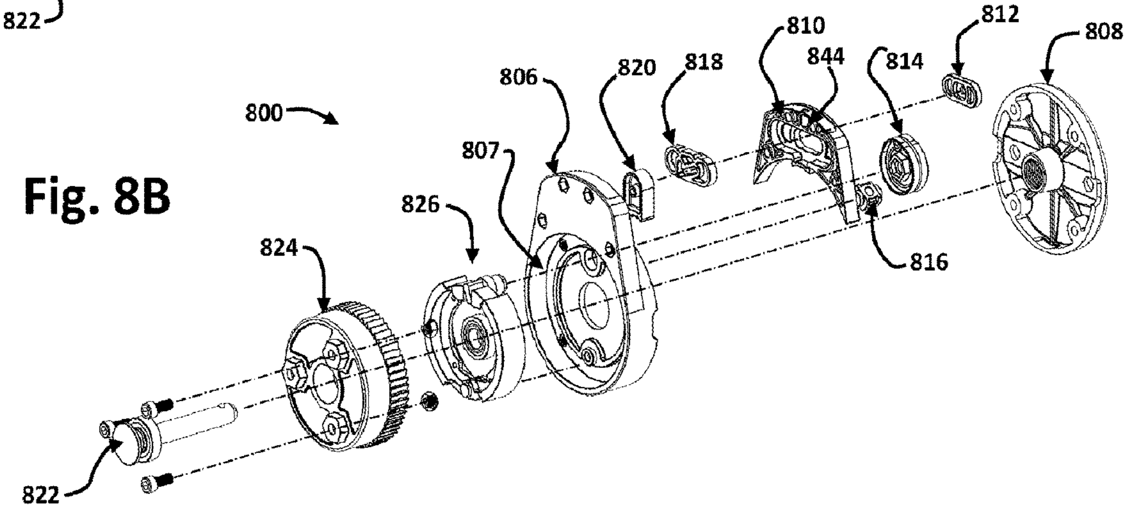
Figure 8C:
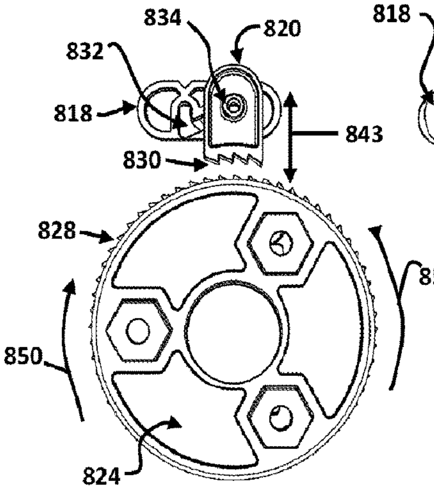
Figure 8D:
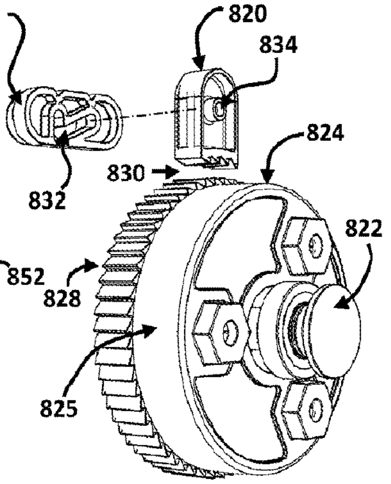
Figure 8E:
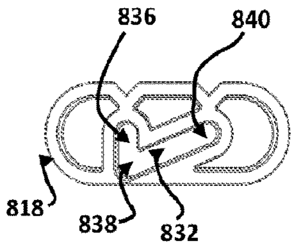
Figure 8F:
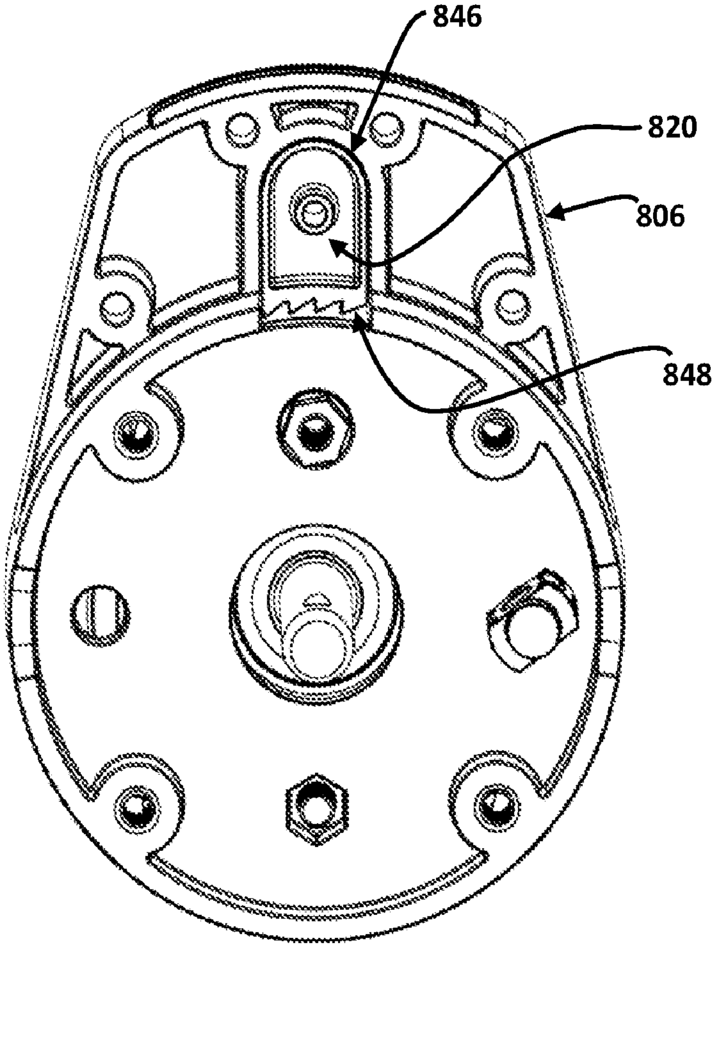
Figure 9E:
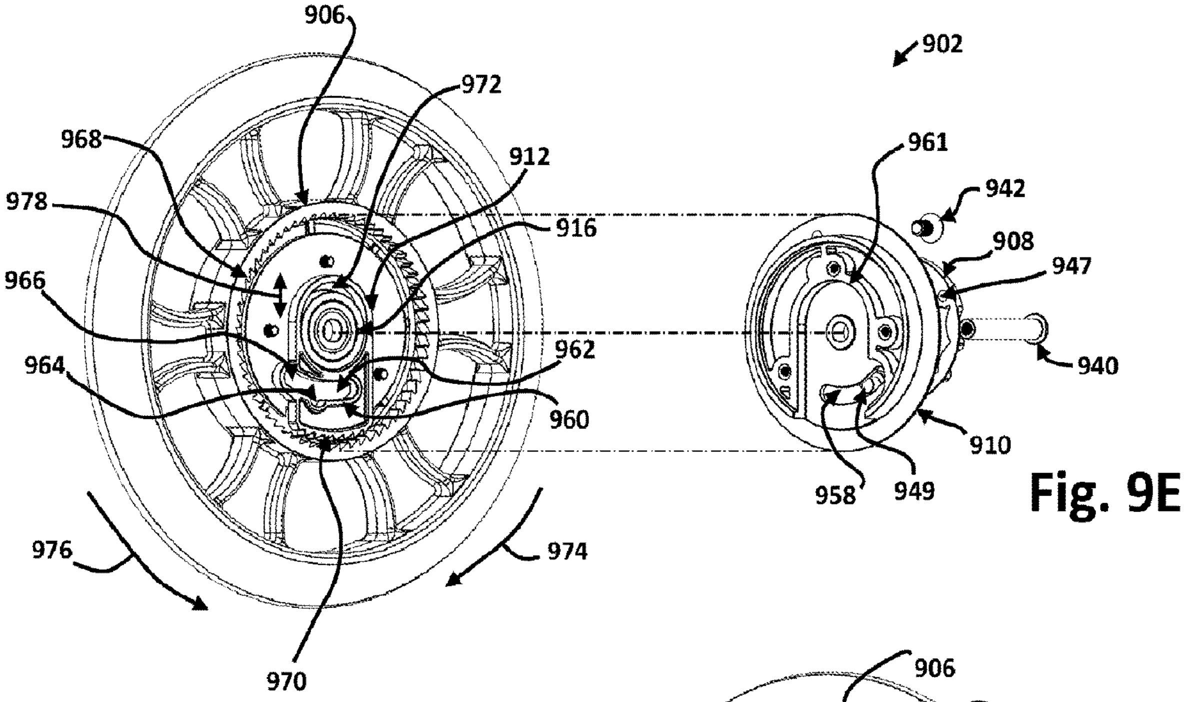
Figure 9F:
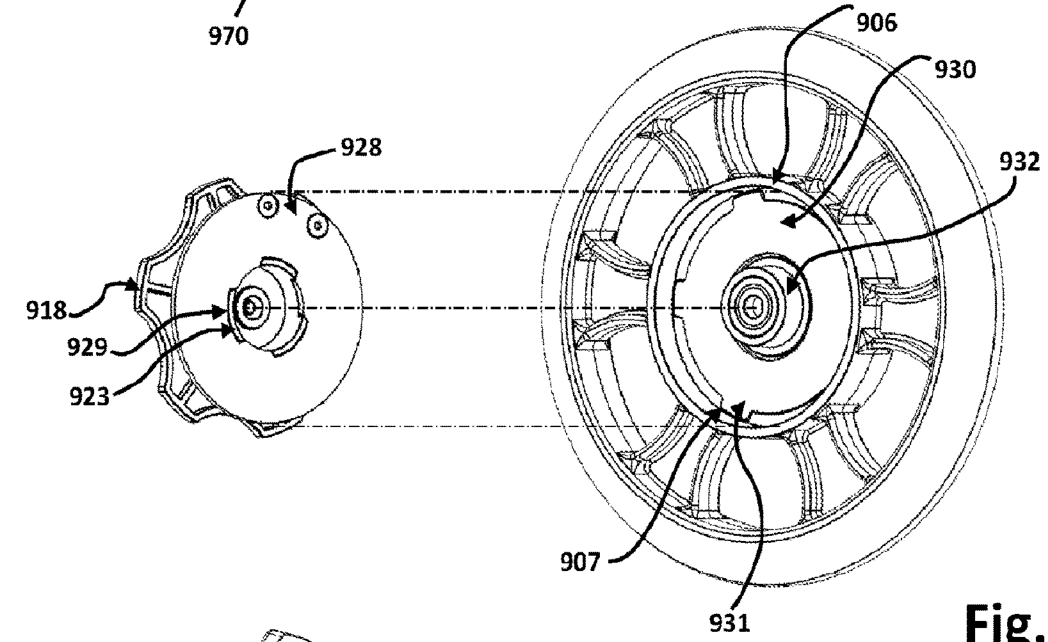
Figure 9G:
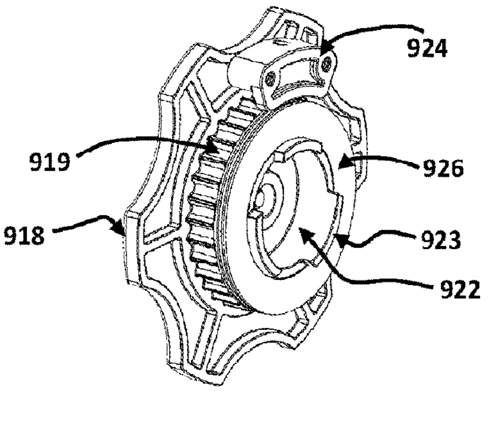

Referring now to FIGS. 6A-6C, one embodiment of leg/footrest assembly 600 is shown. Assembly 600 includes frame attachment members 602A,B, clamping members 606A, B, mounting apertures 604A, B, and footplate 608. Attachment members 602A, B have a body that includes an upper portion forming part of apertures 604A, B and a lower portion for pivotally attaching to footplate 608 via projecting pins 610A,B that form a pivot joint. Each attachment member 602A, B further includes proximate the lower portion thereof a projection or stop pin 618. Clamping members 606A, B have a body that is attached to the upper portion of attachment members 602A, B. The body includes the remaining portion of apertures 604A, B. Apertures 604A, B are used to attached or clamp assembly 600 to the frame of, for example, a gait trainer device. Clamping members 606A, B includes fastener holes for attaching clamping members 606A, B to attachment members 602A,B thereby forming apertures 604A, B. Apertures 604A,B have non-circular shapes to secure assembly 600 from rotational movement. In the embodiment shown, apertures 604A, B have a curved elliptical shape with a linear or straight side portion. This geometry is arranged to capture correspondingly arranged frame member (e.g., elliptical with a straight portion). Nevertheless, other non-rotating geometries or shapes can be employed include polygonal (e.g., triangles, squares, rectangles, etc.)

Footplate 608 includes the substantially planar surface and side brackets 612A,B. In one embodiment, side brackets 612A, B are L-shaped and include an angled extension 614. Apertures 622A,B are also provided for pivotally connecting footplate 608 to attachment members 602A, B. Openings or notches 616 and 620 are provided radially offset from apertures 622A, B. Openings 616 and 620 allow footrest 608 a range of pivot and end of travel limits. Opening 616 and 620 are formed along an arc 624 and have associated curved shapes to accommodate the arc. Opening 616 serves to allow footplate 608 to be deployed (e.g., pivoted or rotated) in the open position allowing a user to stand on the footplate to rest. By pivoting or rotating footplate 608, stop pin 618 enters opening 616 and reaches the end wall of opening 616 thereby deploying the foot rest for standing thereon. In the open position, footplate 608 is deployed in the space between the side frame members of the gait trainer where the user resides. To fold footplate 608 away, it is rotated until stop pin 618 enters opening 620 and reaches the end wall of opening 620. In this closed position, footplate 608 is no longer deployed in the space between the side frame members of the gait trainer. Footplate 608 is now folded out of the way to allow normal walking/gating activity. So arranged, a hinged footrest 608 is provided.

It should be noted that other embodiments of mechanical hinging or folding away can be used instead of that shown as long as footplate 608 can be deployed to operate as a temporary platform which to stand. Furthermore, while the exemplary embodiment shows one footplate assembly 600 attached to one side of the gait trainer's frame, the second corresponding footplate assembly may also be attached to the other side of the gait trainers frame. Further yet, in the single footplate assembly 600 embodiment, footplate 608 may extend substantially across the entire space between the side frames of the gait trainer. Therefore, based on the description herein, other modifications and embodiments are encompassed.

Referring now to FIGS. 1A-F and 7A-7C, the user support coupling 700 will be described in more detail. As shown, user support coupling 700 provides for the easy and secure attachment of user support equipment such as, for example, harnesses, seatbelts, support straps, and related devices. Support coupling 700 includes mating halves (e.g. receiver body 708 and coupler body 710) and a latching member (e.g., 712) to lock and unlock the meeting components. So arranged, user support equipment (e.g., 704) can be fitted to the user while they are seated or in bed and then coupled to the medical device (e.g., gait trainer or the like). This arrangement is easier compared to if the user needs to stand supported while being strapped and buckled into the gait trainer, for example.

The meeting halves 702 of the support coupling 700 includes receiver body 708 and coupler body 710. Receiver body 708 is connected to bracket 706 with fasteners thereby attaching to the central mast system of the frame. Receiver body 708 has a recessed space 714 and extending flanges/projections 716A,B. Recessed space 714 further includes an end of travel or stop wall 720. Extending flanges 716A,B progressively narrow recessed space 714 as it approaches the outer surface of receiver body 708 thus providing a dovetail like arrangement for receiving coupler body 710, which is similarly arranged.

Receiver body 708 further includes a channel or chamber 718 for receiving latching member 712. A notch or opening 722 is also associated with chamber 718 for accommodating a button end portion 730 of latching member 712. Chamber 718 extends substantially through receiver body 708 but not completely through. A hole 742 is provided in a wall of receiver body 708 and that wall also terminates channel 718. As will be described in more detail, hole 742 is used to provide a spring-loaded fastener for attaching to latch member 712 and biasing it in the latching position.

Coupler body 710 includes projecting side portions 724A,B and support mounting projections 728. Projecting side portions 724A,B are arranged to substantially match the geometry of recessed space 714 and receiver body 708. Accordingly, projecting side portion 724A,B widen or extend receiver body 708. At least one of the projecting side portions 724A,B include a notch/opening 726 that acts as a first latching portion that works in conjunction with latching member 712. In this manner, coupler body 710 can be easily inserted into the recessed space 714 of receiver body 708. Coupler body 710 is inserted until it makes contact with stop wall 720. Due to the dovetail arrangement between receiving body 708 and coupler body 710, coupler body 710 cannot be pulled away from receiver body 708.

Latch member 712 is provided so coupler body 710 cannot be inadvertently lifted out of recess 714 and receiver body 708. Latch member 712 includes a body having a first end portion with the button 730 and a second end portion 732 with the latching portion 738. In one embodiment, latching portion 738 includes a slanted latching surface 744 for being received in notch/opening 726 of coupler body 710. In other embodiments, surface 744 can be any shape including rounded, slanted, rectangular, square, polygonal, boss-like, etc.

Latch member 712 further includes a recess portion 734 between its first and second ends 730 and 732. Recess portion 734 is arranged to create a space for coupler body 710 when it is inserted into receiver body 708. A spacer projection 736 is also provided to bear against an inside wall of channel 718 in order to prevent looseness between latch member 712 and that portion of channel 718. A threaded hole 740 is further provided for connecting to a spring-loaded fastener associated with hole 742 in receiver body 708.

In operation, latch member 712 is seated in channel 718 with its latching portion 738 extending into recess 714. As coupler body 710 is inserted into recess 714, projecting side portion 724A encounters the slanted latching surface 744. The slanted latching surface 744 begins to retract from recess 714 against its spring bias and the insertion forces of coupler body 710. This retraction allows coupler body 710 to continue its insertion into recess 714 until slanted latching surface 744 encounters notch/opening 726. Since notch/opening 726 as a similar/complementary shape to latching surface 744, latching surface 744 will be forced by its spring to enter into notch/opening 726 thereby latching or locking coupler body 710 into receiver body 708. In this state, coupler body 710 cannot be lifted out of receiver body 708. In order to release coupler body 710 so it can be lifted out of receiver body 708, button end portion 730 is pushed in the direction of receiver body 708 and causes latching surface 744 to be withdrawn from notch/opening 726. Coupler body 710 can now be lifted out of receiver body 708.

Referring now to FIGS. 1A-F and 8A-8F, the wheel hub brake system 800 will be described in more detail. As shown in FIGS. 1A-F, the wheel hub brake system 800 can be part of a medical device such as, for example, a gait trainer, wheelchair, walker, rollator, lift, cart, etc., or it can be part of a commercial, consumer, or industrial device (i.e., non-medical) such as, for example, a cart, chair, vehicle, etc. In one embodiment, system 800 includes a deeply recessed hub or drum having teeth that engage a pawl body to provide various braking effects. In one arrangement, the pawl body is moved into engagement with the drum teeth and remains (or is locked) there braking the drum from further rotation in either direction. In another arrangement, the pawl body selectively engages the drum teeth and prevents the drum for rotating in one direction but allows the drum to rotate in the other direction thereby providing a one-way clutch (e.g., anti-rollback). A wheel is connected to the drum and rotates therewith.

Referring to FIGS. 8A-8F, one embodiment of a wheel hub system 800 is illustrated having a hub/housing 806, a first side having a drum portion 802, and a second side having a pawl portion 804. The drum portion 802 includes, for example, braking components having a drum 824 and brake shoe assembly 826. The drum 824 includes an inner space 854 having the brake shoe assembly 826 received therein. The pawl portion includes, for example, slide button 812, slide member/body 818, and pawl body 820. Other system components include, for example, covers 808 and 810, brake cable actuator 814 and guide 816 for actuating brake shoe assembly 826 to brake the drum 824, and an axle shaft with bearings for rotatably supporting system 800.

Housing 806 and cover 810 cooperatively house slide member 818 and pawl 820. Housing 806 includes a first recess 807 receiving drum portion 802 and a second recess 846 movably receiving pawl body 820. First recess 807 includes an opening 848 for allowing pawl body 820 to selectively contact drum portion 802 to provide a braking effect. Cover 810 includes an opening 842 and a recess or channel 844 for moveably receiving slide button 812 and slide body 818, which cause movement of pawl body 820.

Drum 824 includes a generally cylindrical body 825 having a plurality of projections or ratchet teeth 828. In one embodiment, teeth 828 are located near the outer edge portion of cylindrical body 825. In other embodiments, teeth 828 may be located further away from the outer edge portion of cylindrical body 825 including, for example, anywhere along cylindrical body 825. Still further, in other embodiments, teeth 828 can extend the entire length of cylindrical body 825 instead of only a portion of the length (as shown). As will be described, drum teeth 828 will selectively engage with pawl body 820 to provide a braking effect.

Pawl body 820 includes, for example, a plurality of projections or teeth 830 and a projecting member 834. In one embodiment, teeth 830 are arcuately disposed near the end portion of pawl body 820. The arcuate arrangement can be made to match the arcuate disposition of teeth 828 on drum 824. In other embodiments, the arcuate disposition of teeth 830 can approximately match (as opposed to exactly match) the arcuate disposition of teeth 828 on drum 824. As will be described, teeth 830 on pawl body 820 will selectively engage teeth 828 on drum 824 to provide a braking effect.

Projecting member 834 extends from pawl body 820 and connects pawl body 820 to slide body 818. In one embodiment, slide body 818 includes a guide/channel 832 for movably receiving projecting member 834. Channel 832 can include first, second and third portions 836, 838, and 840. These channel portions govern the movement and position of pawl body 820 through its projecting member 834 and its resulting behavior with respect to drum 824 (e.g., see movement direction arrow 843). Slide body 818 includes the projecting mounting member for connecting to slide button 812. So arranged, movement of slide button 812 moves slide body 818 and selectively positions pawl body 820 (through its projecting member 834) in various positions in channel 832 (including in first, second, and third channel portions 836, 838, and 840).

In one embodiment, channel portion 840 moves the pawl body 820 out of engagement with drum 824 (e.g., pawl teeth 830 do not engage with drum teeth 828) and no braking effect is provided. Channel portion 838 moves pawl body 820 into engagement with drum 824 (e.g., allowing pawl teeth 830 to engage with drum teeth 828) to provide a braking effect on drum 824.

If channel portion 836 is provided, pawl body 820 can selectively brake drum 824 to provide one-way rotation (or anti-rollback). More specifically, channel portion 836 allows pawl body 820 to move away from drum 824 thereby not providing a braking effect on drum 824. This occurs when drum 824 rotates in the direction of arrow 850 (e.g., see FIG. 8C). Drum 824 rotation in the direction of arrow 850 causes drum teeth 828 to use the diagonal surfaces (or cam surfaces) of pawl teeth 830 to move pawl body 820 away from drum 824 in a ratchet-type arrangement. Channel portion 836 allows this away movement of pawl body 820 (e.g., see arrow 843). Similarly, recess 846 in which pawl body 820 resides is elongate to allow pawl body 820 movement into and out of engagement with drum 824. Drum 824 rotation in the direction of arrow 852 causes pawl body 820, via its teeth 830, to lock or brake drum 824, via its teeth 828, from rotation. Therefore, selective or ratchet-type braking (i.e., also anti-rollback) is achieved by allowing drum 824 to rotate in one direction, but not in another direction.

In the embodiment shown, channel 832 has a V-shaped or a checkmark shape with straight portions connecting portions 836, 838 and 840. In other embodiments, channel 832 can have other shapes including a slanted straight line only as shown between channel portions 838 and 840 (e.g., excluding channel portion 836). Also, curved portions can be used where straight portions are shown.

Hence, wheel hub brake system 800 provides a braking arrangement that can be part of any wheeled device. System 800 includes a deeply recessed drum 824 having ratchet teeth 828 that engage a pawl body 820 to provide various braking effects. In one arrangement, the pawl body 820 is moved into engagement with the drum teeth 828 and remains (or is locked) there braking the drum 824 from further rotation in either direction. In another arrangement, the pawl body 820 engages the drum teeth and prevents the drum for rotating in one direction 852 but allows the drum to rotate in the other direction 850 thereby providing a ratchet or one-way clutch with a selective pawl device.

Referring now to FIGS. 1A-F and 9A-9G, another embodiment of a wheel hub system 900 is shown. In one embodiment, wheel hub system 900 can be applied to caster-type wheels. As shown in FIGS. 1A-F, the system 900 can be part of a medical device such as, for example, a gait trainer, wheelchair, walker, rollator, lift, cart, etc., or it can be part of a commercial, consumer, or industrial device (i.e., non-medical) such as, for example, a cart, chair, vehicle, etc. In one embodiment, system 900 has a friction assembly for selectively applying a degree of resistance or friction drag to the hub and wheel. In another embodiment, system 900 has a brake assembly for providing brake and/or anti-rollback (e.g., selectively braking) effect. In yet another embodiment, system 900 can include both a friction and brake assembly. In this manner, a brake, friction drag, and anti-rollback are provided to a wheel.

Referring to FIGS. 9A-9G, one embodiment of a wheel hub system 900 is shown. System 900 can include a first portion 902 having a brake assembly, a second portion 904 having a friction drag assembly, and a hub 906. Brake assembly 902 uses ratchet teeth within the wheel hub 906 along with a selective pawl 912 to provide total braking and/or selectively braking of the wheel/hub. In one embodiment, brake assembly 902 includes a rotatable slide member 908, housing 910, pawl body 912 and cover 914.

Rotatable slide member 908 includes a projecting member or pin 949. In one embodiment, projecting member 949 is located radially a distance from the center of slide member 908 and proximate to its outer edge. Projecting member 949 extends from the rear face of slide member 908 so that it may be received in pawl body 912. Rotatable slide member 908 includes a central opening for receiving axle shaft 940 about which slide member 908 can rotate. Rotation of slide member 908 causes projecting member 949 movement through an arc defined by the amount of rotation. Rotation of slide member 908 is accomplished by gripping an outer handle portion having radially positioned detents or handle grips and then rotating slide member 908 about axle shaft 940. As will be described, this rotation allows brake assembly 902 to brake, unbrake, or selectively brake the wheel/hub 906 via pawl body 912.

Housing 910 includes a portion 960 for receiving and guiding movement of pawl body 912 and a channel or opening 958 through which projecting member 949 extends. Pawl body receiving portion 960 may be in the form of a channel or guide formed with walls to accommodate pawl body 912 and allow its movement (e.g., linear movement) to provide the aforementioned braking effects. Channel or opening 958 allows projecting member 949 to extend therethrough and into pawl body channel 960 to determine the various type of braking modes (brake, unbrake, or selective brake) desired. Housing 910 is further mounted via fastener 942 to the wheel fork structure to prevent housing 910 from rotation. Housing 910 further includes indicia for indicating the braking mode selected via rotatable slide member 908. These indicia include braking indicia 948, selective (or one-way ratchet type) braking indicia 950, and unlocked or unbraking indicia 952. Projecting member 949 can extend through the body of housing 910 as an indicator to be used with indicia 948, 950, and 952. In other embodiments, projecting member 949 may not extend through the body of housing 910 and other means instead can be used including, for example, a separate projecting member or other painted, molded, or otherwise distinctive indicia suitable for this purpose.

Housing member 910 further includes a central projecting member 911 that is received by slide member 908 for mounting/mating with slide member 908 and allowing rotation of slide member 908. Also, a spring-loaded ball 946 and detent 947 arrangement is provided to automatically guide and releasably position rotatable slide member 908 in the appropriate positions for braking, unbraking, or selectively braking the wheel/hub.

Pawl body 912 includes a central aperture 972, channel 960, and projections or teeth 970. Central aperture 972 is oversized to permit linear movement of pawl body 912. Channel 960 can include, in one embodiment, first portion 962, second portion 964, and third portion 966. Projecting member 949 is received in channel 960 and can be moved within channel 962 to these respective portions.

When projecting member 949 is located in first portion 962, pawl body 912 and its teeth 970 are in contact with hub 906 and its teeth 968. Teeth 970 and 968 locked together and braking or preventing rotation of wheel hub 906. When projecting member 949 is located in second portion 964, pawl body 912 and its teeth 970 provide selective braking (or anti-rollback) of hub 906. Channel portion 964 allows pawl body 912 to move into and out of contact with hub teeth 968 thereby an anti-rollback or selective braking effect on hub 906.

This accomplished by channel portion 964 having an enlarged section, bump-out or extension that allows linear (or up and down) movement of pawl body 912, as indicated by arrow 978. When projecting member 949 is located in this enlarged section, pawl body 912 and its teeth 970 contact hub 906 and its teeth 968 to prevent rotation of the wheel/hub 906 in the direction of arrow 976 (e.g., see FIG. 9E). Hub 906 rotation in the direction of arrow 974 causes hub teeth 968 to use the diagonal surfaces (or cam surfaces) of pawl teeth 970 to move pawl body 912 away from hub teeth 968 in a ratchet-type arrangement. This movement causes projecting member 949 to be positioned out of the enlarged section of channel portion 964 indicating pawl body 912 movement away from hub 906. This movement away from hub 906 allows hub 906 to rotate Similarly, pawl receiving portion or channel 961 (in housing 910) in which pawl body 912 resides is elongate or oversized to allow pawl body 912 movement into and out of engagement with hub teeth 968. Therefore, selective or ratchet-type braking (i.e., also anti-rollback) is achieved by allowing hub 906 to rotate in one direction, but not in another direction.

When projecting member 949 is located in portion 966, pawl body 912 is moved out of contact with hub teeth 968 indicating an unlocked or unbraking mode. In this mode, wheel/hub 906 is free to rotate. In one embodiment, pawl body channel 960 is slightly arcuate and configured so that projecting member 949 guides pawl body 912 to braking, unbraking, and selective or ratchet-type braking (e.g., anti-rollback). In other embodiments, pawl body channel 960 can be curved more or less than that shown or can be linear or approximately straight so long as the aforementioned modalities are provided.

As previously described, wheel hub assembly 900 may include friction drag assembly 904. Friction drag assembly 904 includes, for example, a knob or handle 918, mounting post 922, bearing 926, friction disc 928, and hub disc 930. In one embodiment, knob or handle 918 includes a central projecting member 917 having a plurality of detents 919. Knob or handle 918 is connected to mounting post 922 via a threaded connection that allows knob or handle 918 to be turned on mounting post 922 for movement along mounting post 922. Knob or handle 918 further includes indicia 954 and 956 indicating the relevant amount of friction drag that is applied as knob or handle 918 is rotated on mounting post 922.

In one embodiment, mounting post 922 includes a pin or projection 920 for affixing to the wheel support structure such as, for example, a support fork. This prevents rotation of mounting post 922. A ball spring/detent assembly 925 and 924 is provided and works in conjunction with detents 919 to allow knob or handle 918 to rotate on mounting post 922 at fixed increments of rotation. This is accomplished by detents 919 being circumferentially disposed on central projecting member 917 for receiving ball 925 under spring pressure. Rotation of knob or handle 918 compresses the spring and allows ball 925 to move from one detent to another along central projecting member 917. In this manner, knob or handle 918 maintains its rotational position until it is rotated again.

Mounting post 922 further includes extensions 923 at one end thereof. Extensions 923 are used to connect mounting post 922 to friction disc 928, which includes corresponding slots or cutouts 929 for receiving the extensions. Extensions 923 further prevent rotation of friction disc 928 by this arrangement but allow friction disc 928 to move along the length of the extensions. Hub disc 930 is received within a recess of hub 906 and includes extensions 931 that are received in hub slots 907. Through this arrangement, extensions 931 and slots 907 fix hub disc 930 to hub 906 so that hub disc 930 rotates with hub 906. Bearings 916 and 932 further provided and operate with axle shaft 940 to rotatably mount hub 906 thereon. Fastener 944 maintains the respective assemblies in position relative to axle shaft 940.

In operation, rotation of knob or handle 918 causes its movement on mounting post 922. Rotation of knob or handle 918 in a manner that causes it to move inwards towards hub 906 causes central projecting member 917 to apply pressure to friction disc 928. This pressure causes friction disc 928 to either correspondingly move along the length of extensions 923 of mounting post 922 (if there is room for movement) until movement is restricted by contact with hub disc 930, or if movement is already restricted by hub disc 930, to apply the corresponding pressure to hub disc 930.

Through this arrangement, when friction disc 928 is contacting hub disc 930, friction is applied to the rotation of hub 906 because friction disc is fixed against rotation and is pressing against hub disc 930. Also, through this arrangement, the amount pressure applied by friction disc 928 in its contact with hub disc 930 correspondingly controls the amount of friction drag that is applied to the rotation of hub 906. Thus, rotation of knob or handle 918 controls the amount of pressure and thus the amount of friction drag that is applied to hub 906.

Hence, wheel hub system 900 can be in the form of various embodiment. One embodiment includes a friction drag assembly for selectively applying a degree of resistance or friction drag to the hub and wheel. In another embodiment, system 900 may include a brake assembly for providing brake and/or anti-rollback (e.g., selectively braking) effect. In yet another embodiment, system 900 can include both a friction-drag and brake assembly. In this manner, brake, friction drag, and anti-rollback are provided to a wheel.

Referring now to FIGS. 1A-F and 10A-10C, a caster wheel system 1000 is shown having a swivel lock. In one embodiment, caster wheel system 1000 can be applied to any type of caster wheel or swivel assembly. As shown in FIGS. 1A-F, the system 1000 can be part of a medical device such as, for example, a gait trainer, wheelchair, walker, rollator, lift, cart, etc., or it can be part of a commercial, consumer, or industrial device (i.e., non-medical) such as, for example, a cart, chair, vehicle, etc. In one embodiment, system 1000 includes a selective spring plunger assembly (e.g., see FIG. 10C) in the stem housing 1002 to lock the vertical swivel of the caster 1020 so that caster 1020 may be oriented to a particular direction (or multiple directions). In one example, that direction may be oriented to that most effective to the use of the anti-reverse feature of caster wheel system 900 (e.g., FIGS. 9A-9G). In this manner, the caster wheel 1020 can selectively swivel or be locked in one or more directions or orientations.

Figure 10A:
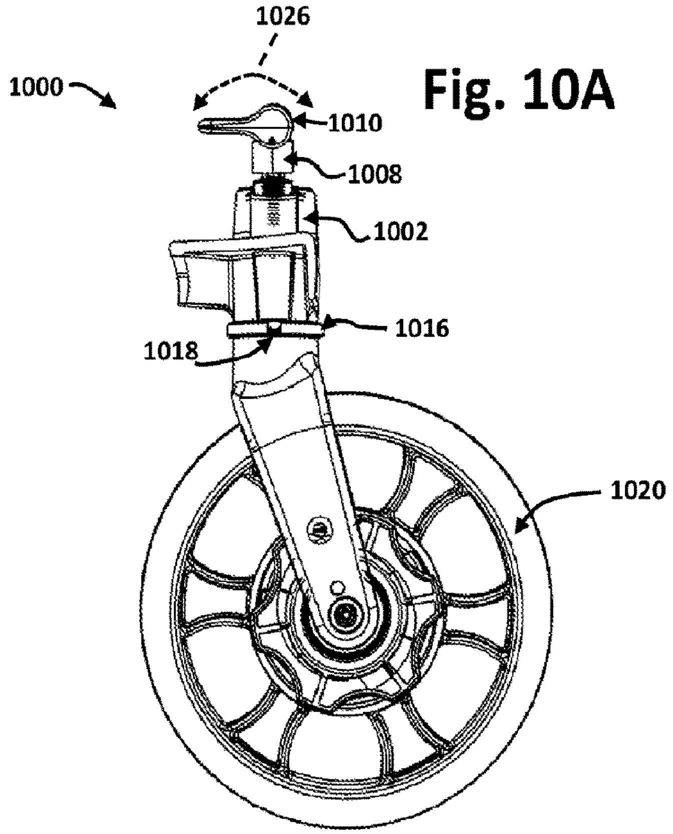
FIGS. 10A-10C illustrate one embodiment of a swivel lock system.
Figure 10B:
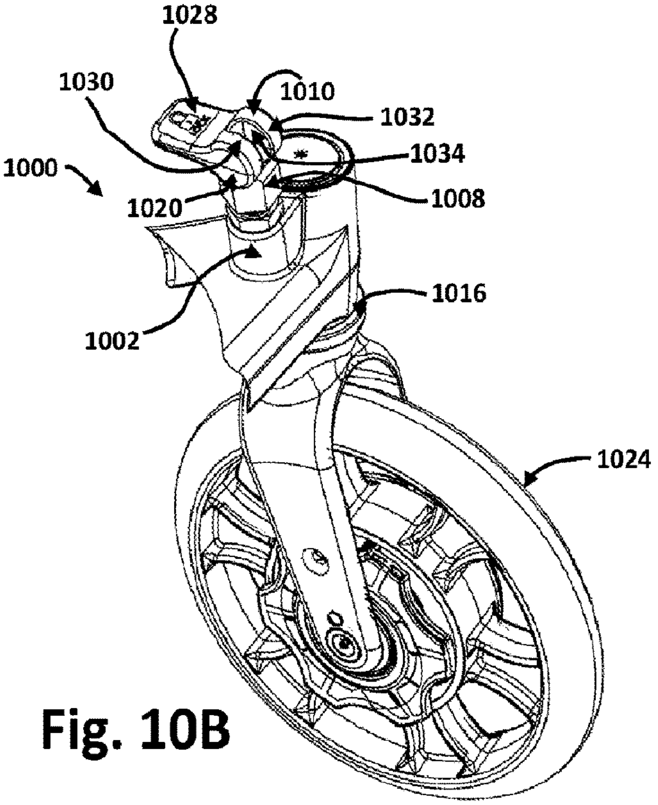
Figure 10C:
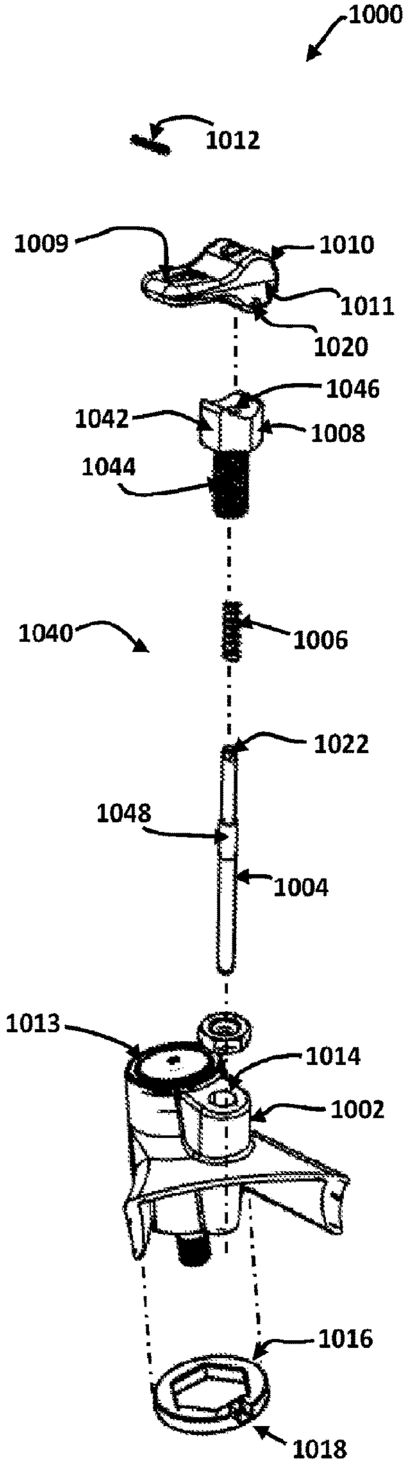
Figure 11A:
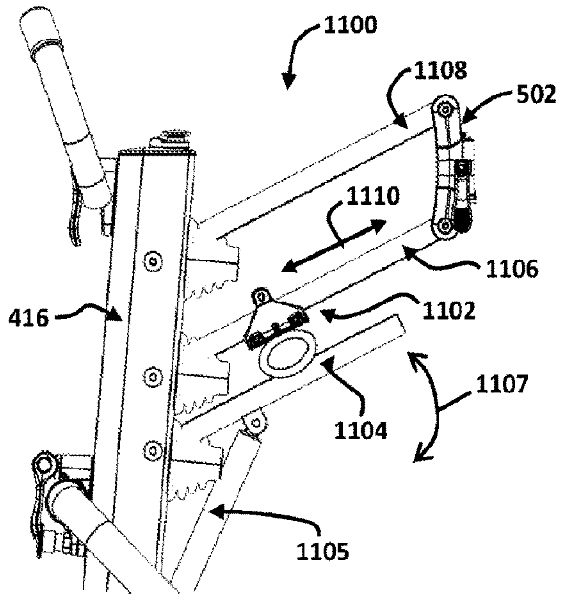
FIGS. 11A-11D illustrate one embodiment of a suspension system.
Figure 11B:
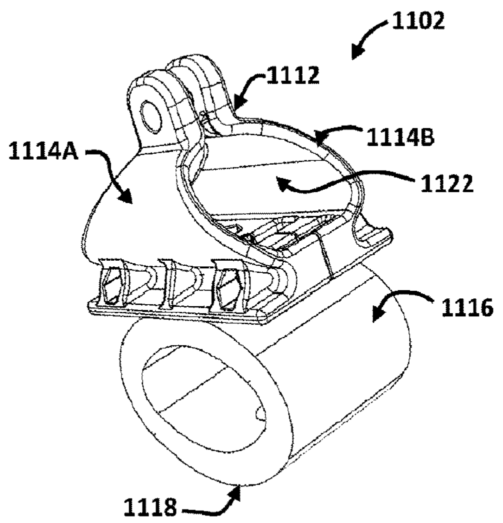
Figure 11C:
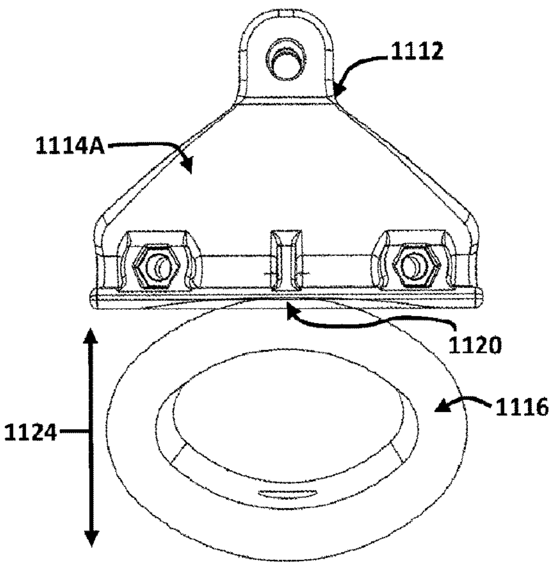
Figure 11D:
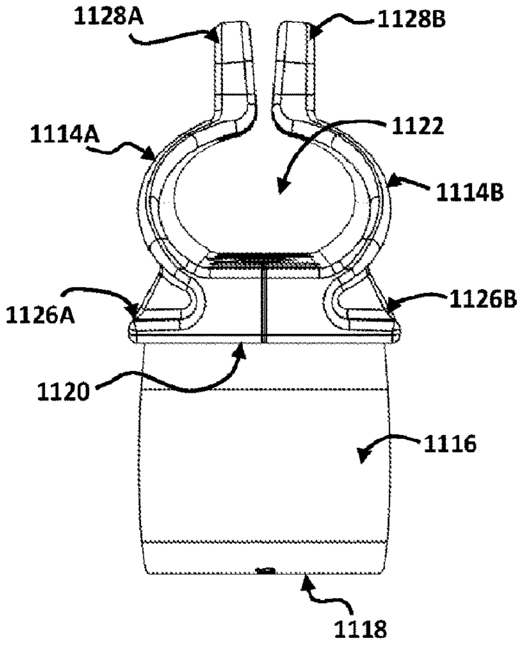
Figure 12A:
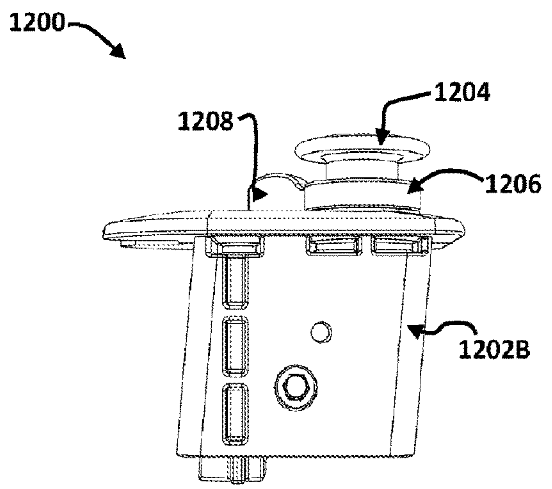
FIGS. 12A-12J illustrate one embodiment of a control button system.
Figure 12B:
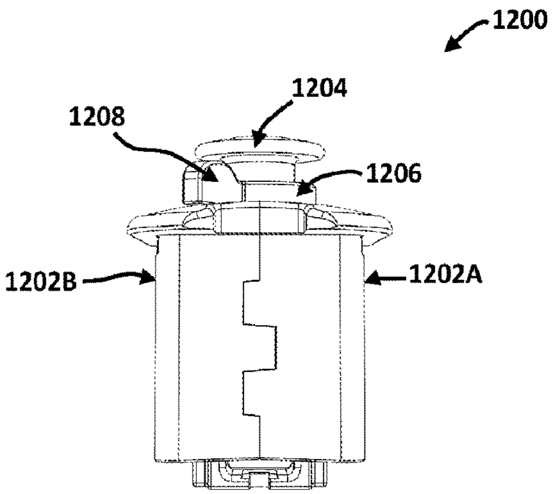
Figure 12C:
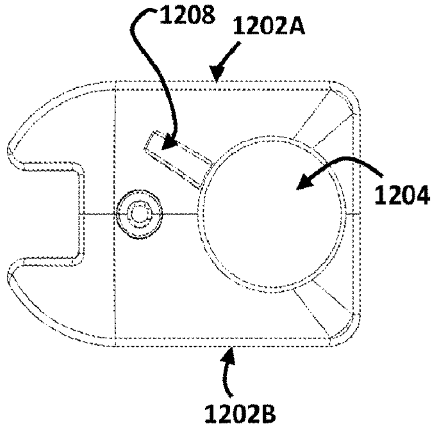
Figure 12D:
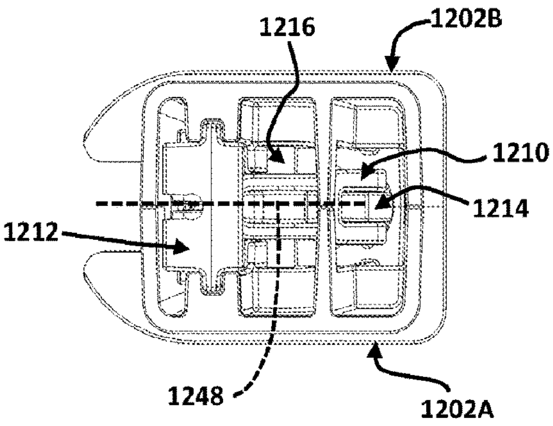
Figure 12E:
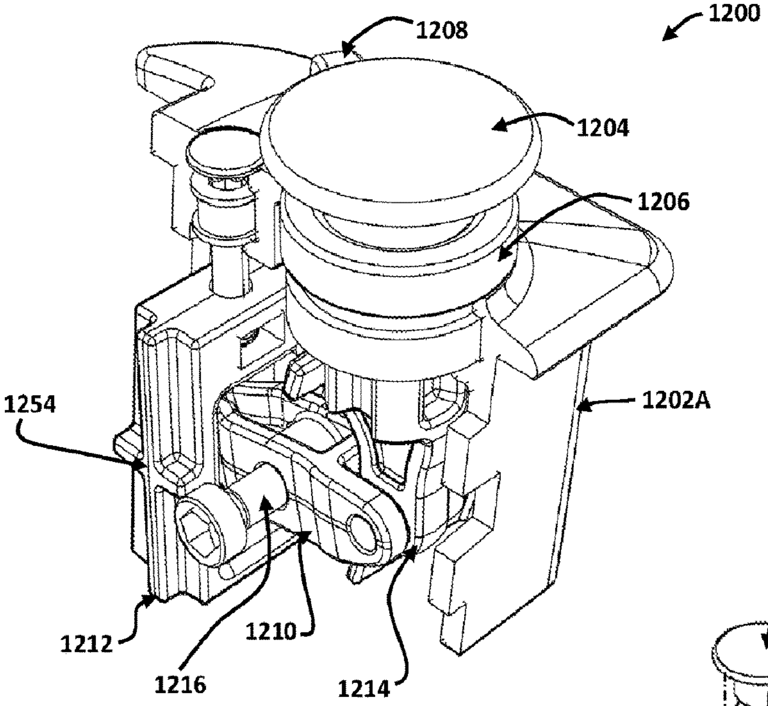
Figure 12F:
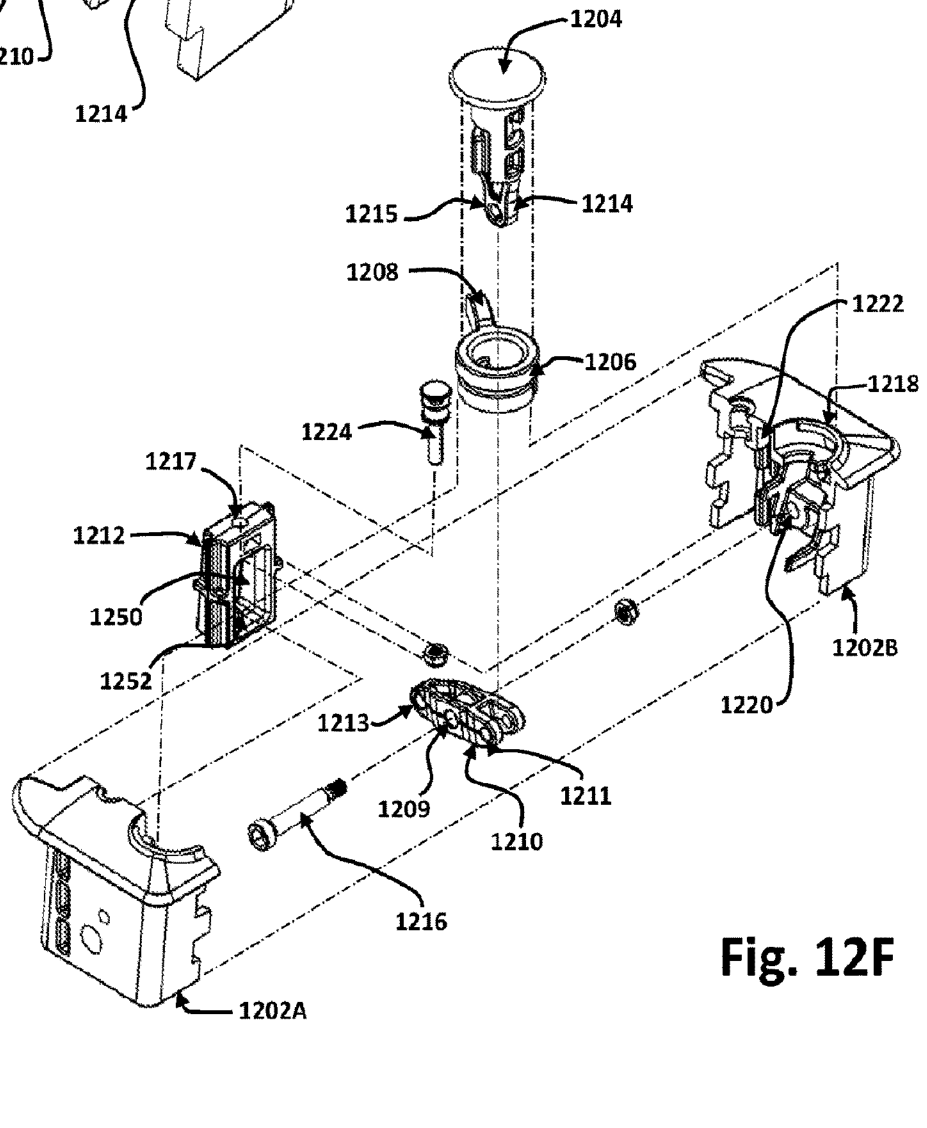
Figure 12G:
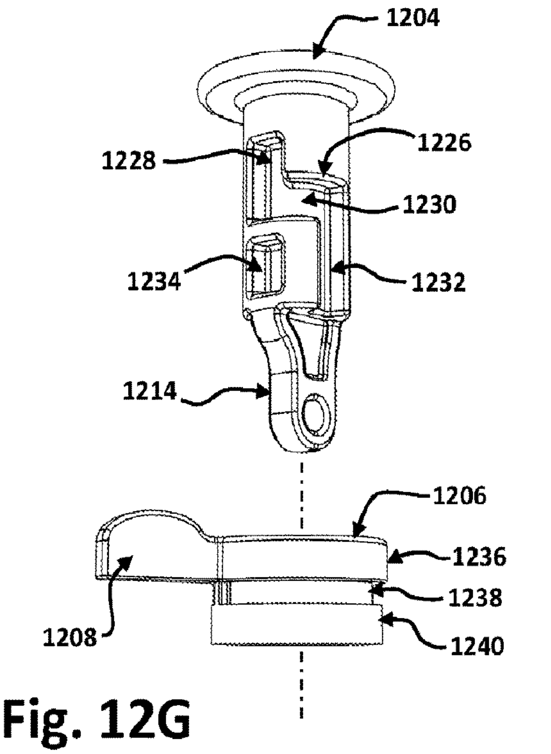
Figure 12H:
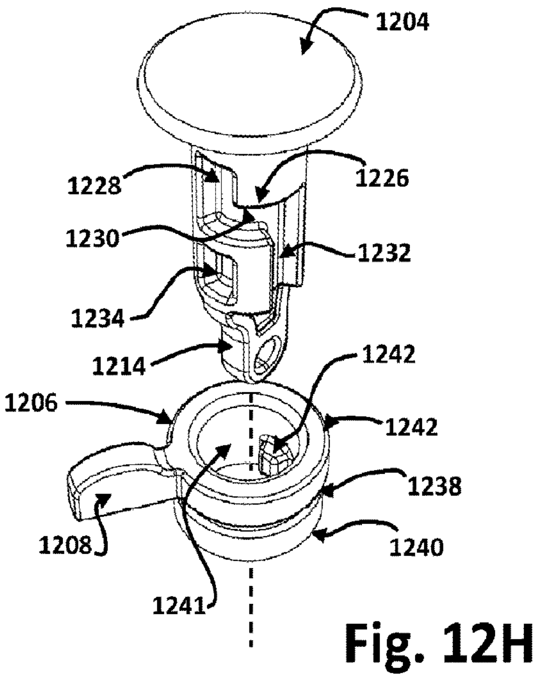
Figure 12I:
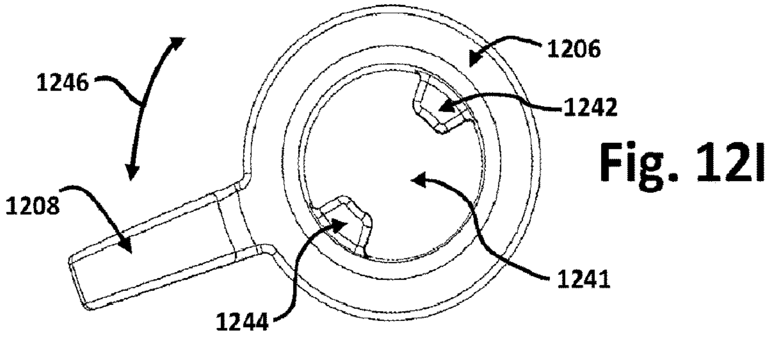
Figure 12J:
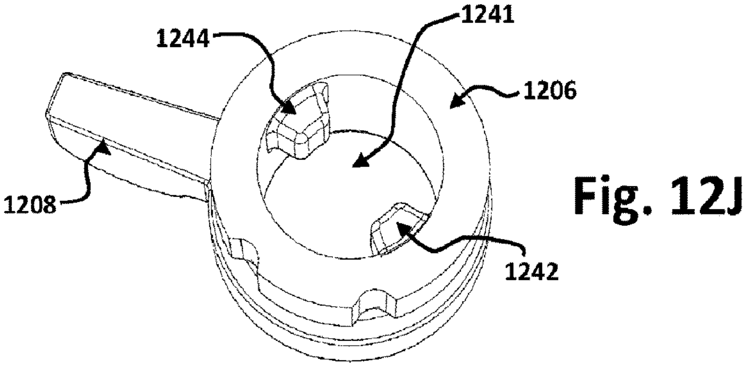
Figure 13:
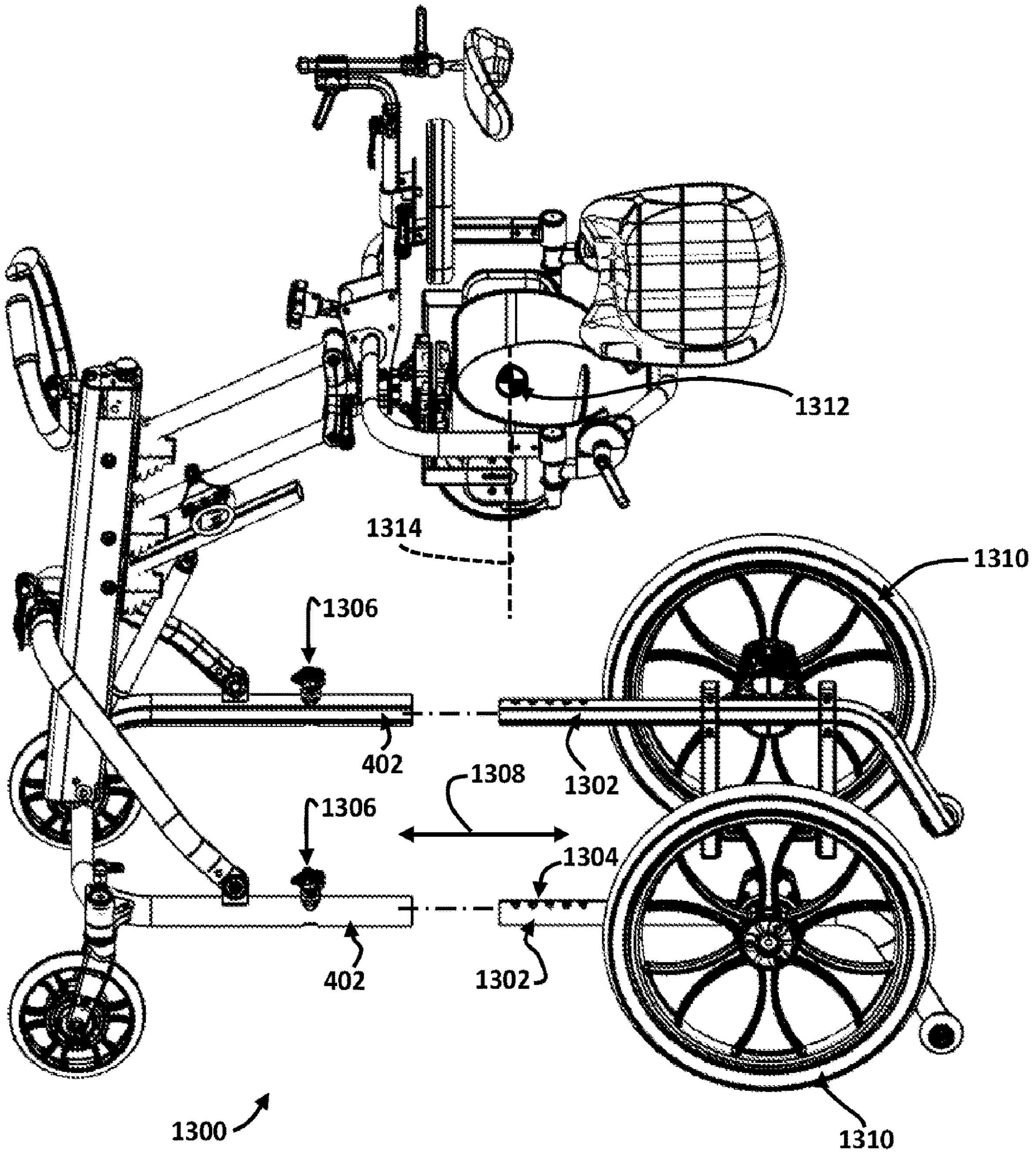
FIG. 13 illustrate one embodiment of a center of gravity adjustment system.

Referring now to FIGS. 10A-10C, one embodiment of a caster wheel system 1000 is shown. System 1000 includes a housing 1002 and selective spring plunger assembly 1040. In one embodiment, housing 1002 has first and second chambers 1013 and 1014. First chamber 1013 is oriented generally vertical and includes the caster wheel swivel components (e.g., bearings and shaft). Second chamber 1014 is oriented at an angle relative to first chamber 1013 and includes components of the selective spring plunger assembly 1040. The angle can be any angle so long as second chamber 1014 directs the plunger assembly 1040 to lock or unlock the caster wheel swivel assembly. Housing 1002 is further adapted to be mounted to a supportive frame structure as shown in FIGS. 1A-F.

In one embodiment, plunger assembly 1040 includes shaft 1004, spring 1006, mounting 1008, and lever 1010. Lever 1010 has a handle portion 1009 and a pivot portion 1011. Lever 1010 rotates via pivot portion 1011, as shown by arrow 1026, between a locked (e.g., FIG. 10A) and an unlocked state for plunger assembly 1040. Handle portion 1009 includes indicia 1028 indicating the locked or unlocked state of plunger assembly 1040. Portion 1011 includes a fork portion having first and second sides 1030 and 1032 with a gap 1034 therebetween. Gap 1034 is oriented to accommodate a portion of shaft 1004 as lever 1010 is rotated between the locked and unlocked states.

Lever 1010 further includes hole/opening 1020 for receiving shaft 1004 mounting pin 1012. Mounting pin 1012 extends through receiving hole 1020 in lever 1010 and receiving hole 1022 in shaft 1004 thereby mounting shaft 1004 to lever 1010. As shown in the current embodiment, receiving hole 1020 is located proximate the perimeter (e.g., off-center) of pivot portion 1011. With this arrangement, receiving hole 1020 displaces vertically when lever 1010 is rotated and causes shaft 1040 to move vertically (e.g., extend or retract). As will be further described, this movement of shaft 1040 causes the plunger assembly to either lock or unlock the swivel of wheel 1024. Pivot portion 1011 bears against plunger mounting 1008 and is seated and allowed to rotate within an arcuate support section 1042 thereof as shown. Mounting 1008 includes a central chamber 1046 through which shaft 1004 extends and spring 1006 resides. Chamber 1046 captures and seats against an interior surface thereof one end of spring 1006 so that spring 1006 does not extend out of chamber 1046 while a portion of shaft 1004 can extend therethrough. This allows the other end of spring 1006 to exert pressure on shaft 1004 (via shoulder portion 1048) as shaft 1004 is moved within chamber 1046. Mounting 1008 further includes a threaded portion 1044 for attaching the mounting within second chamber 1014 of housing 1002. Other forms of attachment may also be used.

A collar/washer 1016 is provided and connected to the caster swivel assembly and rotates when wheel 1024 swivels. In one embodiment, a space 1018 is provided on collar 1016 for receiving shaft 1004 and locking the caster swivel in a particular direction. Receiving space 1018 can be a notch in the body of collar 10016 as shown. In other embodiments, receiving space 1018 can be a cut-out, aperture, hole, chamber, extension etc. that cooperates with shaft 1004 to lock and unlock the caster wheel swivel.

So arranged, rotation of lever 1010 extends and retracts shaft 1004 under spring 1006 pressure to locked (e.g., FIG. 10A) and unlocked the caster wheel swivel assembly. When shaft 1004 is its extended position (e.g., FIG. 10A), the end portion of shaft 1004 is at least partially received within locking space 1018 and prevents collar 1016 from rotation, which prevents the caster wheel swivel assembly from swiveling. When shaft 1004 is its retracted position, the end portion of shaft 1004 is withdrawn from locking space 1018 and allows rotation of collar 1016, which allows the caster wheel swivel assembly to swivel. In this manner, a simple and convenient caster wheel swivel locking assembly is provided.

Referring now to FIGS. 1A-F and 11A-11D, a suspension system 1100 is shown. In one embodiment, system 1100 can be applied to any type of device. As shown in FIGS. 1A-F, the suspension system 1100 can be part of a medical device such as, for example, a gait trainer, wheelchair, walker, rollator, lift, cart, etc., or it can be part of a commercial, consumer, or industrial device (i.e., non-medical) such as, for example, a cart, chair, vehicle, etc. In one embodiment, suspension system 1100 includes an elastomeric or spring assembly 1102 between two support arms 1104 and 1106. In another embodiment, the position of elastomeric or spring assembly 1102 between the two support arms is adjustable (e.g., arrow 1110) to vary the amount of spring suspension being provided. In this manner, supportive accessories (of, for example, a gait trainer (e.g., harnesses, seatbelts, support straps, etc.)) are provided a natural and tunable spring suspension that is supportive and comfortable to the user.

Referring now to FIGS. 11A-11D, one embodiment of a suspension system 1100 is shown. Suspension system 1100 includes, for example, a spring assembly 1102 and support arms 1104 and 1106. An additional support arm 1108 may also be provided. Support arms 1106 and 1108 are pivotably connected on one end to frame mast portion 416 and on the other end to coupling portion 502. Support arm 1104 is also connected on one end to frame mast portion 416 and to actuator 1105 at another location as shown. Actuator 1105 is connected on one end to the frame mast portion 416 and can extend and retract to vary the angle of support arm 1104 as indicated by arrow 1107.

In one embodiment, spring assembly 1102 includes a mount body 1112 and spring/resilient member 1116. Mount body 1112 as first and second sides 1114A,B and a gap/receiving space 1122. First and second sides 1114A,B can be fastened together via fastening extensions/projections 1128A,B (and a fastener) to provide a releasable clamp or clamping-type of arrangement. Fastening extensions 1128A,B include an aperture and are located in an upper portion of mount body 1112. As shown in the current embodiment, a portion of the body of support arm 1106 is received in gap 1122 and affixed thereto via the clamping arrangement. So configured, spring assembly 1102 can be attached anywhere along the length of support arm 1106 as represented by arrow 1110. In other embodiments, attachment or locking arrangements other than clamping can be used including, for example, a pin plunger and hole(s) or other similar mechanisms.

Spring/resilient member 1116 can be any spring (compression or otherwise), resilient or elastomeric material or configuration. In the embodiment shown, member 1116 is elastomeric and includes a generally elliptical or rounded body. In other embodiments, other shapes can be used including circular, helical, cylindrical, monolithic, square, rectangular, etc. Spring member 1116 includes portions 1118 and 1120. Portion 1118 represents a contact area were spring member 1116 makes contact with support arm 1104. Portion 1120 represents a contact and support area were spring member 1116 makes contact and is connected to a lower portion of mount body 1112. Mount body further includes in its lower portion first and second extensions 1126A,B for contact and support relative compression of spring member 1116. Spring member 1116 can compress and decompress in the direction of arrow 1124 as a load or weight is applied to support arm 1106.

In operation, spring assembly 1102 acts as a load on a class 2 lever in the form of support arm 1104 (where the fulcrum is the pivot connection to frame mast portion 416) in opposition to parallel and opposing support 1106. Support arm 1104 is fixed in position by actuator 1105 and does not move under load. Spring assembly 1102 can be located at various positions on support arm 1106 to tune the amount of suspension provided.

Each position along support arm 1106 provides a differing amount of suspension, cushioning or stiffness to the system and, hence, the user. For example, when spring assembly 1112 is located near the lever fulcrum end (i.e., near frame mast portion 416), more suspension or cushioning is provided to support arm 1106. In this position, spring member 1116 experiences significant apparent load from support arm 1106 resulting in increased compression of spring member 1116. This increased compression provides support arm 1106 with the ability to pivot about its fulcrum (e.g., pivot connection to the frame mast portion 416) under load to provide a degree of cushioning to the user being supported. As spring assembly 1102 is moved away from fulcrum end (e.g., frame mast portion 416), the apparent load on spring member 1116 from support arm 1106 decreases resulting in less compression of spring member 1116 thereby "stiffening" the suspension system. Hence, a first or greater amount of suspension is provided by positioning spring assembly 1102 near frame mast portion 416 and a second or lesser amount of suspension is provided by positioning spring assembly further away from frame mast portion 416. In this manner, the degree of suspension load required or desired for any individual user can be fine-tuned by the positioning of spring assembly 1102.

Referring now to FIGS. 1A-F and 12A-12J, a control assembly 1200 is shown. In one embodiment, control assembly 1200 is used to control a cable such as, for example, a Bowden cable that is used for controlling an actuator. As shown in FIGS. 1A-F, the assembly 1200 can be part of a medical device such as, for example, a gait trainer, wheelchair, walker, rollator, lift, cart, etc., or it can be part of a commercial, consumer, or industrial device (i.e., non-medical) such as, for example, a cart, chair, vehicle, etc. In one embodiment, the typical pull action required to actuate a Bowden cable (i.e., a flexible wire rope or cable within a semi-rigid jacket) is converted into a more user-friendly pushbutton action. In yet another embodiment, the pushbutton, cable operator (e.g., lever) and cable are approximately inline as opposed to a right angle, which can cause space and clearance issues. In yet another embodiment, a releasable lock can be provided. This allows an operator to select the locked feature as desired and prevent incidental or accidental actuation of the pushbutton.

Referring now to FIGS. 12A-12J, one embodiment of assembly 1200 includes button 1204, lever 1210, releasable lock collar 1206 and cable guide 1212. These components can be contained with a housing 1202A,B and in an inline configuration as represented by alignment line 1248. In one embodiment, housing 1202A,B includes an aperture 1218 for button 1204 and collar 1206, a lever shaft receiving hole 1220, and a cable guide receiving space 1222. Housing 1202A,B is configured as shown to allow pressing of pushbutton 1204, pivotal movement of lever 1210, and if necessary vertical movement of cable guide 1212 in actuating a Bowden cable and corresponding actuator cylinder (or the like).

In one embodiment, button 1204 includes a body/shaft having an extension 1214, at least a first channel 1226, and at least a first recess 1234. Extension 1214 includes an aperture for connecting button 1204 to lever 1210. This allows movement of button 1204 to cause pivotal movement of lever 1210. Also, a second channel and recess can be included opposite to and similar to first channel 1226 and first recess 1234 in the pushbutton 1204 body/shaft.

In one embodiment, channel 1226 includes portions 1228, 1230, and 1232. As will be described in more detail, these portions receive lock out extensions (e.g., 1242 and 1244 of collar 1206). Channel portions 1228 and 1232 are positioned along the length of the body of button 1204 and are offset from each other. Channel portion 1230 is positioned across (the length of) the body of button 1204 and connects channel portions 1228 and 1232. So arranged, channel 1226 forms and orthogonal (i.e., right angles) serpentine shape. Other arrangements and configurations than that shown are also contemplated including varying the size, length, position and shape of each of the channel portions.

Recess 1234 is also positioned in the body of button 1204. In one embodiment, recess 1234 is spaced separate from and positioned in line with channel portion 1228. Recess 1234 can also be positioned separate from and across channel portion 1232. In other embodiments, recess 1234 can include other positions in the body of button 1204 including those offset from channel portions 1228 and 1232.

In one embodiment, collar 1206 is a turn collar having a handle 1208 connected to a body having upper and lower portions 1236 and 1240 and a recessed middle portion 1238. Collar 1206 further includes a button body receiving space 1241 and first and second projections 1242 and 1244. In one example, projection 1244 is received in channel 1226 as a guide to allow vertical movement button 1204 in actuating the Bowden cable. Projection 1242 operates in a similar manner in the embodiment where a second channel and recess are provided in button 1204. Projections 1242 (and 1244 if provided) are moved within channel 1226 by rotation of collar 1206. The recessed portion 1238 of collar 1206 receives outer portion of housing aperture 1218 and allows collar 1206 to rotate or turn as represented by arrow 1246. Rotation of collar 1206 is aided by use of handle portion 1208.

In the embodiment shown, channel 1226 provides at least two pushbutton states or conditions. Channel portion 1232 is used during assembly to allow projection 1244 to enter channel 1226. Projection 1244 is placed in channel portion 1228 by rotation of collar 1206 and use of channel portion 1230. When projection 1244 is in channel portion 1228, pushbutton 1204 can be pressed down a distance corresponding to the length of channel portion 1228. Thus, channel portion 1228 corresponds to a first state or position for pushbutton 1204 and any corresponding actuator controlled by pushbutton 1204. This first state can also, for example, represent a direction of movement of the actuator being controlled by pushbutton 1204 to allow for retraction of the actuator. Thus, channel 1226 and its portions can be configured to allow for selectable control of an actuator (i.e., movement or no movement).

When projection 1244 is in channel portion 1230, a lockout is achieved. In lockout, projection 1244 and channel portion 1230 prevent pushbutton 1204 from movement. In this manner, incidental or accidental pushbutton 1204 actuation can be avoided and a second state (i.e., lock out) for pushbutton 1204 is achieved. Further, as previously described, in additional embodiments a second channel (like channel 1226) can also be provided for second extension 1242 and collectively operate in the same manner described.

In one embodiment, lever 1210 has first and second portions 1211 and 1213 and a central portion having pivot aperture 1209. First portion 1211 includes a hole or aperture for connecting lever 1210 to button 1204 (via fastener and extension 1214 and aperture 1215). Second portion 1213 also includes a hole or other receiving space for connecting to the end of a Bowden cable. A mounting shaft 1216 extends through pivot aperture 1209 and hole 1220 of housing 1202B. So arranged, movement of pushbutton 1204 causes movement of lever first portion 1211. And, movement of lever first portion 1211 causes movement (opposite movement in this example) of lever second portion 1213 to which one end of the Bowden cable is connected. This, in turn, causes the wire or cable in the Bowden cable to move within its semi-rigid jacket thereby allowing actuation of an actuator (like actuator 1105 in FIG. 11A to, for example, extend or retract). In some embodiments, the Bowden cable controls an actuator in the form of a reciprocating hydraulic cylinder having one or more valves (including, for example, check valves) controlling the flow of hydraulic fluid within the cylinder that allows the cylinder to extend, retract, and/or hold its position. The amount of Bowden cable movement can also control the rate of actuator movement (e.g., in extending, retracting, or holding its position). In essence, lever 1210 provides a reverse action feature that converts pushbutton 1204 movement into opposite movement for the Bowden cable connection end (e.g., push movement on the pushbutton is converted to pull movement on the cable, or vice-versa) to appropriately control the actuator.

In one embodiment, cable guide 1212 is provided and includes a lever receiving space 1250, guide aperture 1217, and cable opening 1252 against which the jacket of the Bowden cable can bear against or be fixed thereto. A guide shaft or adjustment screw 1224 is further provided and connected to cable guide 1212 through aperture 1217. Cable guide 1212 also has cross-shaped extensions 1254 on its sides that are received in spaces 1222 on housing portions 1202A,B. So arranged, guide shaft or adjustment screw 1224 and housing spaces 1222 allow cable guide 1212 to adjust or fine tune the positioning of cable guide 1212 and, therefore, the position of the attached Bowden cable jacket.

Referring now to FIGS. 1A-1F and 13, one embodiment of center of gravity adjustment system 1300 is shown. In the example of a gait trainer device (and other load bearing devices), main wheels (e.g., 1310) are designed to bear the weight of the user and to provide for ease of maneuverability in turning. System 1300 enhances that ability by allowing the axle of wheel 1310 to be placed at or near the vertical axis 1314 of the user's center of gravity 1312. This is accomplished by telescoping frame support members 1302 to which the wheels 1310 are attached.

In one embodiment, telescoping support members 1302 extend and retract as represented by arrow 1308 from lower frame portions or members 402. In this regard, support members 1302 are sized so that they may be inserted into lower frame members 402 and may slidingly extend therefrom or retract thereinto. A plurality of holes or apertures 1304 are provided in telescoping support members 1302 to releasably fix the position of telescoping support members 1302 relative to lower frame members 402. As shown, the plurality of apertures 1304 are proximate an end portion of support member 1302. However, in other embodiments, the plurality of apertures 1304 can be positioned anywhere along the length of support member 1302.

A plunger assembly 1306 is provided on lower frame members 402 and includes a lock handle and pin. As shown, plunger assembly 1306 is positioned proximately an end section of lower frame portion 402. In other embodiments, the position of plunger assembly 1306 can be anywhere along the length of lower frame portion 402. Plunger assembly 1306 locks and unlocks the telescoping mobility of support member 1302 and lower frame portion 402. In one embodiment, the plunger assembly 1306 lock handle releasably extends and retracts the lock pin into and out of a desired hole in the plurality of holes 1304.

In operation, the axles of wheels 1310 that are connected to support members 1302 are aligned with the vertical axis 1314 of user's center of gravity 1312. Upon alignment, plunger assembly 1306 and its lock handle are used to extend the pin of the plunger assembly into the nearest hole of the plurality of holes 1304 to lock the positional adjustment into place. The lock handle of plunger assembly 1306 is also used to retract the pin of the plunger assembly from the hole when another or further positional adjustment is needed. In one embodiment, the lock handle has a twistable knob that extends the lock pin when the knob is turned in one direction and retracts the pin when the knob is turned in another direction. Furthermore, the pin may be spring-loaded if desired to assist automatic indexing of the plurality of holes 1302. In this manner, an indexed center of gravity adjustment is provided that does not require removal and repositioning of wheels 1310 relative to the frame and support members they are mounted on. The adjustment is accomplished by simple telescoping (e.g., extension and retraction) movement of support members 1302.

While the present invention has been illustrated by the description of embodiments thereof, and while the embodiments have been described in considerable detail, it is not the intention of the descriptions to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures can be made from such details without departing from the spirit or scope of the general inventive concept.

The invention claimed is:

1. A gait trainer comprising:

a frame having a lower frame portion and a vertical frame portion; the lower frame portion comprising first and second extended frame portions and a space therebetween; the vertical frame portion comprising at least one patient support;

a leg rest assembly coupled to the lower frame portion, the leg rest assembly comprising:

a frame attachment assembly having first and second spaced apart members, each member having: first and second portions, a mounting opening proximate the first portion and a projection proximate the second portion;

a footplate assembly pivotably connected proximate to the second portion, the footplate assembly comprising:

substantially planar surface for supporting a foot of a user; and first and second spaced apart bracket portions disposed on sides of the planar surface, each bracket portion having first and second openings for receiving the projection of one of the first and second members; the first and second openings limiting the pivotal movement of the planar surface.

2. The gait trainer of claim 1 wherein the first opening comprises a notch.

3. The gait trainer of claim 1 wherein the first and second openings are disposed along an arcuate path.

4. The gait trainer of claim 1 wherein the mounting opening comprises a non-circular shape and receives therein a section of the lower frame portion to resists turning motion of the frame attachment.

5. The gait trainer of claim 1 wherein the footplate assembly is mounted to one of the first or second extended frame portions.

6. The gait trainer of claim 1 wherein a second footplate assembly is mounted to the lower frame portion.

7. The gait trainer of claim 1 wherein the bracket portion comprises an angled extension and wherein the first and second openings are disposed in the angled extension.

8. The gait trainer of claim 1 wherein the substantially planar surface comprises a first position extending into the space and wherein the first position is configured to allow the gait trainer to be rolled from a first location to a second location.

9. The gait trainer of claim 1 wherein the bracket portion comprises a pivoting joint for connecting the substantially planar surface to the frame.

10. The gait trainer of claim 1 wherein the first and second extended frame portions are horizontally extendable and retractable from the lower frame portion.

11. The gait trainer of claim 1 wherein the first and second extended frame portions are horizontally telescoping support members that are inserted into corresponding lower frame members of the lower frame portion so as to slidingly extend therefrom or retract thereinto.

12. The gait trainer of claim 11 wherein a plurality of holes or apertures is provided in the horizontally telescoping support members to releasably fix the position of the telescoping support members relative to the lower frame members.

13. The gait trainer of claim 1 wherein the first and second extended frame portions are each provided with a wheel hub system for attachment of a wheel.

14. The gait trainer of claim 1 further comprising a suspension system coupling the at least one patient support to the vertical frame portion.

15. The gait trainer of claim 1 wherein the projection comprises a stop pin.

16. The gait trainer of claim 1 wherein the first opening comprises an arcuate notch having:

a first portion that is open to receive the projection, a second portion having an end wall to contact the projection; and the first and second portions spaced part by a curved portion.

17. A mobility system comprising:

a frame having first and second extended frame portions and a space therebetween;

a leg rest assembly coupled to the frame, the leg rest assembly comprising:

a frame attachment assembly having first and second spaced apart members, each member having an upper and lower portion; the upper portion comprising a mount opening and the lower portion comprising a projection;

a footplate assembly pivotably connected proximate the lower portion, the footplate assembly comprising:

a substantially planar foot support surface; and first and second spaced apart brackets disposed on sides of the planar foot support surface, each bracket comprising first and second openings for receiving the projection; the first and second openings limiting pivotal movement of the foot support surface.

18. The system of claim 17 wherein the first and second openings are disposed along an arc formed in each of the brackets.

19. The system of claim 17 wherein the mount opening comprises a non-circular shape and receives therein a section of the frame to resist turning motion of the frame attachment.

20. A mobility system comprising:

a frame having first and second extended frame portions and a space therebetween;

a leg rest assembly coupled to the frame, the leg rest assembly comprising first and second spaced apart frame attachment members, each member comprising an upper portion having a mount opening and a lower portion having a projection;

a footplate assembly pivotably connected to the lower portion and comprising first and second spaced apart brackets, each bracket comprising first and second openings for receiving the projection, the first and second openings limiting pivotal movement of the footplate assembly.

21. The system of claim 20 wherein the first and second openings are disposed along an arc formed in each of the brackets.

22. The system of claim 20 wherein the mount opening comprises a non-circular shape and receives therein a section of the frame to resist turning motion of the frame attachment.

* * * * *